(12) United States Patent
Abe

(10) Patent No.: US 9,715,090 B2
(45) Date of Patent: Jul. 25, 2017

(54) ZOOM LENS AND IMAGE PICKUP APPARATUS INCLUDING THE SAME

(71) Applicant: CANON KABUSHIKI KAISHA, Tokyo (JP)

(72) Inventor: Hirofumi Abe, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/632,288

(22) Filed: Feb. 26, 2015

(65) Prior Publication Data
US 2015/0253545 A1    Sep. 10, 2015

(30) Foreign Application Priority Data

Mar. 5, 2014 (JP) .................................. 2014-042356

(51) Int. Cl.
*G02B 15/14*      (2006.01)
*G02B 13/00*     (2006.01)
(Continued)

(52) U.S. Cl.
CPC ............. *G02B 13/009* (2013.01); *G02B 9/64* (2013.01); *G02B 15/14* (2013.01); *G02B 15/173* (2013.01);
(Continued)

(58) Field of Classification Search
CPC ........ G02B 15/00; G02B 15/14; G02B 15/16; G02B 15/163; G02B 15/167;
(Continued)

(56) References Cited

U.S. PATENT DOCUMENTS 6,025,962 A * 2/2000 Suzuki ................. G02B 15/173
                                                                  359/557
7,221,511 B2 * 5/2007 Toyama ............... G02B 27/646
                                                                  359/554
(Continued)

FOREIGN PATENT DOCUMENTS

CN      103293647 A    9/2013
EP       1739470 A2    1/2007
(Continued)

OTHER PUBLICATIONS

Chinese Office Action issued in connection with CN Application No. 201510096304.7 on Nov. 2, 2016, (10 pages).

*Primary Examiner* — Thong Nguyen
(74) *Attorney, Agent, or Firm* — Carter, DeLuca, Farrell & Schmidt, LLP

(57) ABSTRACT

A zoom lens includes: a first lens unit having a positive refractive power; a second lens unit having a negative refractive power; a third lens unit having a positive refractive power; a fourth lens unit having a positive refractive power; and a fifth lens unit having a positive refractive power or a negative refractive power, in which the first lens unit and the fifth lens unit do not move for zooming, and the second lens unit and the fourth lens unit move during zooming, in which a focal length fw of the zoom lens at a wide angle end, a focal length f2 of the second lens unit, and a focal length of a positive lens, which is included in the second lens unit are suitably set.

7 Claims, 13 Drawing Sheets

(51) Int. Cl.
  *G02B 15/22* (2006.01)
  *G02B 9/64* (2006.01)
  *G03B 13/36* (2006.01)
  *H04N 5/232* (2006.01)
  *G02B 15/173* (2006.01)

(52) U.S. Cl.
  CPC ............. *G02B 15/22* (2013.01); *G03B 13/36* (2013.01); *H04N 5/23296* (2013.01)

(58) Field of Classification Search
  CPC ...... G02B 15/173; G02B 15/20; G02B 15/22; G02B 15/24; G02B 15/28
  See application file for complete search history.

(56) References Cited

U.S. PATENT DOCUMENTS

| | | | |
|---|---|---|---|
| 2010/0033838 A1* | 2/2010 | Saori | G02B 15/20 359/684 |
| 2011/0267705 A1 | 11/2011 | Mihara et al. | |
| 2012/0154524 A1* | 6/2012 | Matsumura | G02B 15/173 348/36 |
| 2012/0314291 A1* | 12/2012 | Kogo | G02B 15/173 359/557 |
| 2013/0222923 A1* | 8/2013 | Wei | G02B 15/24 359/684 |

FOREIGN PATENT DOCUMENTS

| | | |
|---|---|---|
| JP | 2007-178598 A | 7/2007 |
| JP | 2007-178769 A | 7/2007 |
| JP | 2009217121 A | 9/2009 |

\* cited by examiner

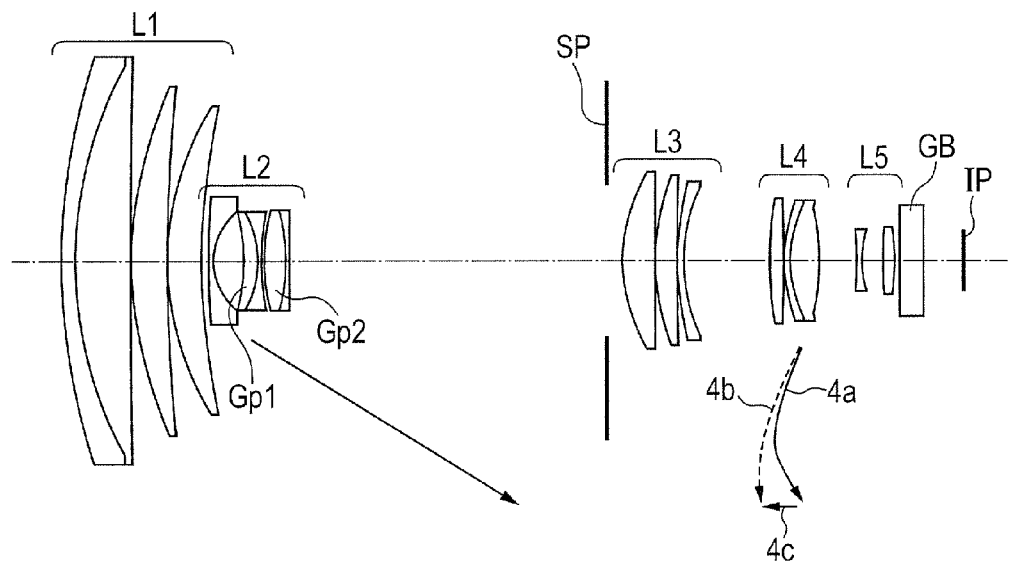
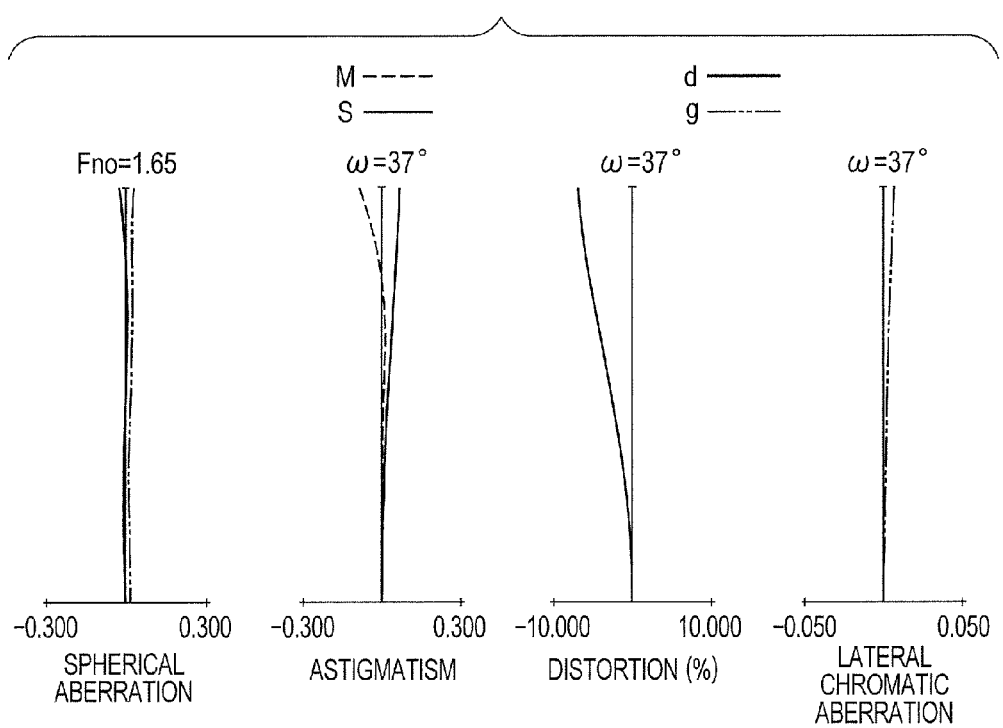

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same, which are suitable for an image pickup apparatus using a solid-state image pickup element, such as a video camera, an electronic still camera, a broadcasting camera, and a monitoring camera, or an image pickup apparatus such as a silver-halide film camera.

Description of the Related Art

A zoom lens which has a short total lens length, a compact size, a high zoom ratio, and a high resolving power has been requested for an imaging optical system used in an image pickup apparatus. It is known that a positive-lead type zoom lens in which a lens unit having a positive refractive power is arranged closest to an object side easily achieves a high zoom ratio.

In Japanese Patent Application Laid-Open Nos. 2007-178598 and 2007-178769, there is disclosed a five-unit zoom lens which includes first to fifth lens units having positive, negative, positive, positive, and negative refractive powers and being arranged in order from an object side to an image side.

In a zoom lens in general, in order to realize the downsizing of the entire system while the high zoom ratio is ensured, it is only necessary to reduce the number of lenses while increasing the refractive powers of the lens units constructing the zoom lens. However, in the zoom lens configured in such a manner, a lens thickness increases with an increase in the refractive power of each of the lens surfaces, and an effect of shortening the lens system becomes insufficient. Further, various aberrations are frequently generated, and hence the satisfactory correction for the various aberrations becomes difficult to carry out. Thus, the high optical performance becomes difficult to obtain.

In the positive-lead type five-unit zoom lens described above, in order to realize the downsizing of the entire system, the high zoom ratio, and the high optical performance over the entire zoom range at the same time, it is important to set each element of the zoom lens appropriately. For example, it is important to set the refractive power of the second lens unit for varying magnification, which moves during zooming, the lens structure of the second lens unit, and the like appropriately. When those configurations are not appropriate, the entire system is increased in size in realizing the high zoom ratio, variations in various aberrations accompanying zooming are increased, and it becomes very difficult to obtain the high optical performance over the entire zoom range.

SUMMARY OF THE INVENTION

A zoom lens according to one embodiment of the present invention includes in order from an object side to an image side: a first lens unit having a positive refractive power; a second lens unit having a negative refractive power; a third lens unit having a positive refractive power; a fourth lens unit having a positive refractive power; and a fifth lens unit having a positive refractive power or a negative refractive power, in which the first lens unit and the fifth lens unit do not move for zooming, and the second lens unit and the fourth lens unit move during zooming, in which the second lens unit includes, in order from the object side to the image side, a negative lens, a first positive meniscus lens having a concave surface on the object side, and a negative lens, in which the second lens unit includes at least three negative lenses and at least two positive lenses, and in which the following conditional expressions are satisfied:

$1.2 < fp1/fp2 < 3.0;$ $2.5 < |fp1/f2| < 5.0;$ and $0.9 < |f2/fw| < 2.0,$ where fw represents a focal length of the zoom lens at a wide angle end, f2 represents a focal length of the second lens unit, fp1 represents a focal length of the first positive meniscus lens, and fp2 represents a focal length of a second positive lens, which is in a second position when counted from the object side of the at least two positive lenses arranged in the second lens unit.

Further features of the present invention will become apparent from the following description of exemplary embodiments with reference to the attached drawings.

BRIEF DESCRIPTION OF THE DRAWINGS

FIG. 1 is a lens cross-sectional view at a wide angle end of a zoom lens of Embodiment 1 according to the present invention.

FIG. 2A is an aberration diagram at the wide angle end of the zoom lens of Embodiment 1.

DESCRIPTION OF THE EMBODIMENTS

Now, a zoom lens and an image pickup apparatus including the same of the present invention are described with reference to the attached drawings. The zoom lens of the present invention includes, in order from an object side to an image side, a first lens unit having a positive refractive power, a second lens unit having a negative refractive power, a third lens unit having a positive refractive power, a fourth lens unit having a positive refractive power, and a fifth lens unit having a positive or negative refractive power. The second lens unit and the fourth lens unit move during zooming. The first lens unit, the third lens unit, and the fifth lens unit do not move for zooming. The fourth lens unit moves during focusing.

Figure 2B:
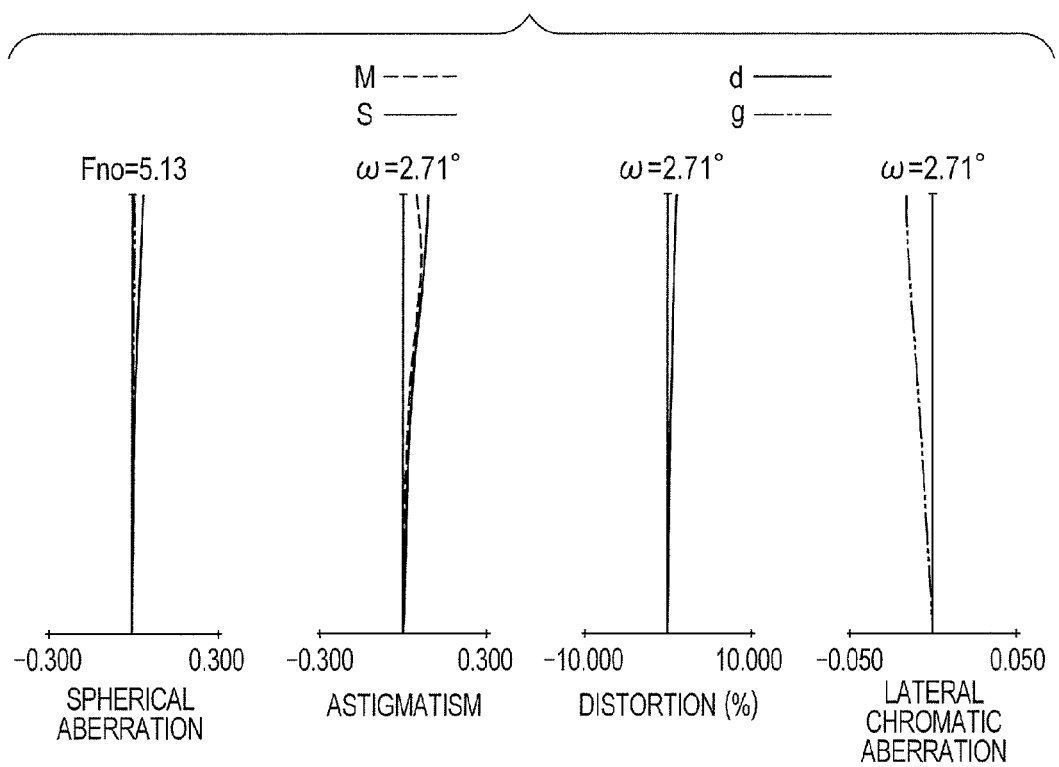
FIG. 2B is an aberration diagram at an intermediate zoom position of the zoom lens of Embodiment 1.
Figure 2C:
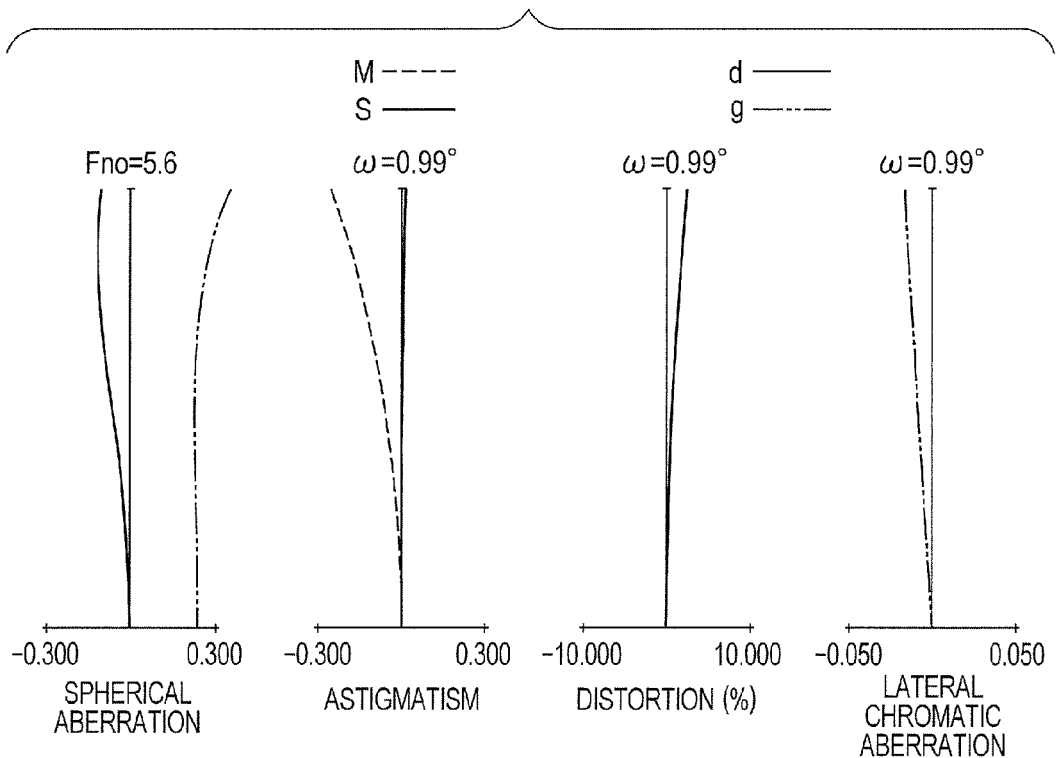
FIG. 2C is an aberration diagram at a telephoto end of the zoom lens of Embodiment 1.

FIG. 1 is a lens cross-sectional view at a wide angle end (short focal length end) of a zoom lens according to Embodiment 1 of the present invention. FIGS. 2A, 2B, and 2C are aberration diagrams at the wide angle end, an intermediate zoom position, and a telephoto end (long focal length end), respectively, of the zoom lens of Embodiment 1. The zoom lens of Embodiment 1 has a zoom ratio of 39.50 and an aperture ratio (F number) of from 1.65 to 5.60.

Figure 3:
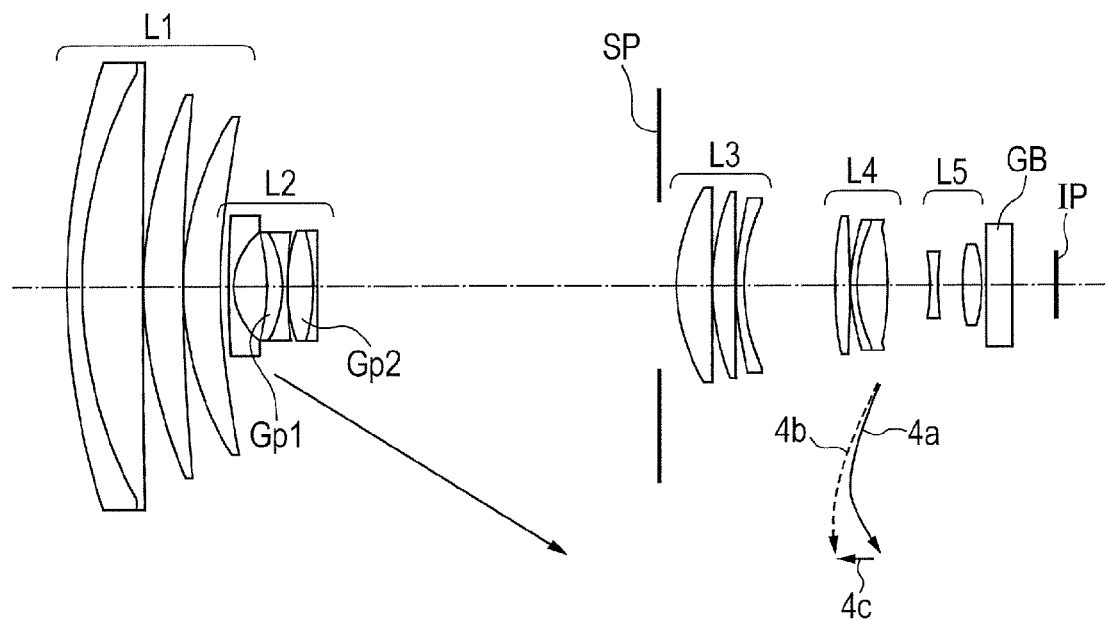
FIG. 3 is a lens cross-sectional view at a wide angle end of a zoom lens of Embodiment 2 according to the present invention.
Figure 4A:
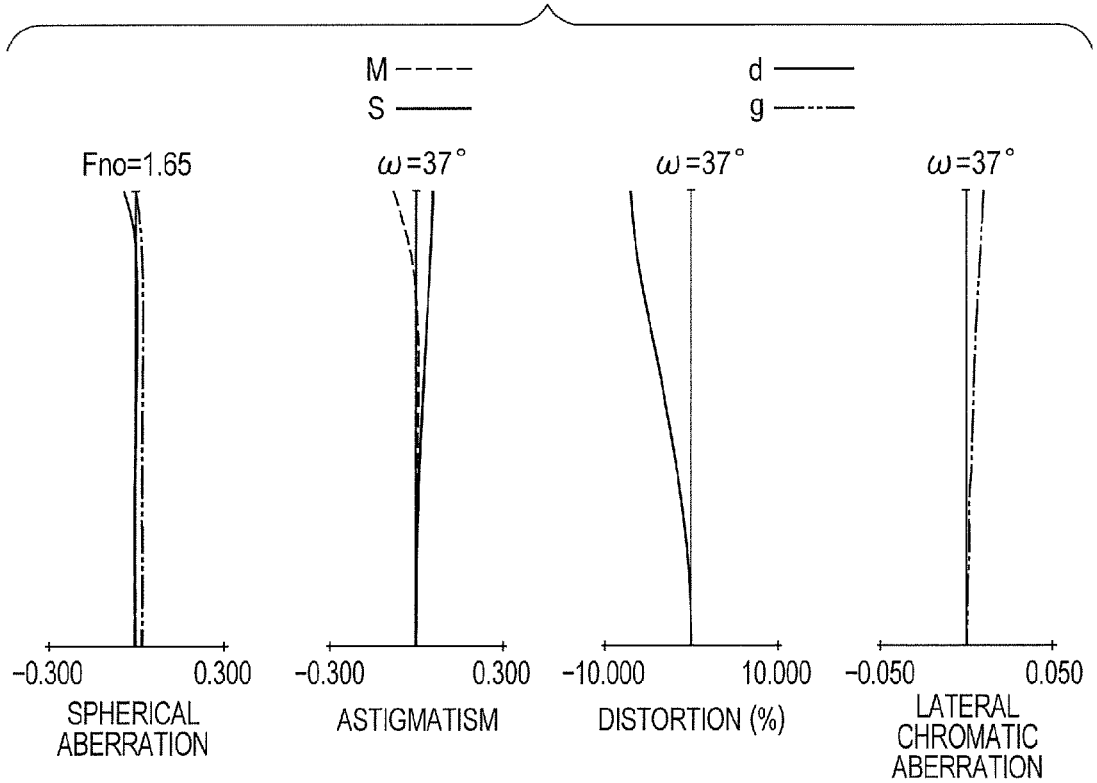
FIG. 4A is an aberration diagram at the wide angle end of the zoom lens of Embodiment 2.
Figure 4B:
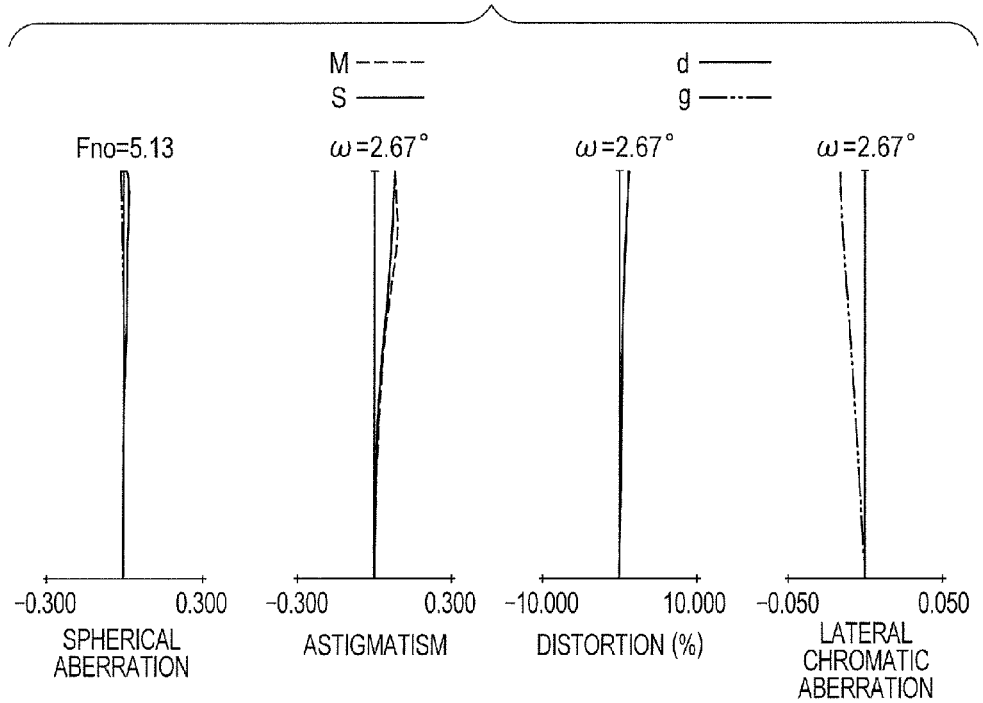
FIG. 4B is an aberration diagram at an intermediate zoom position of the zoom lens of Embodiment 2.
Figure 4C:
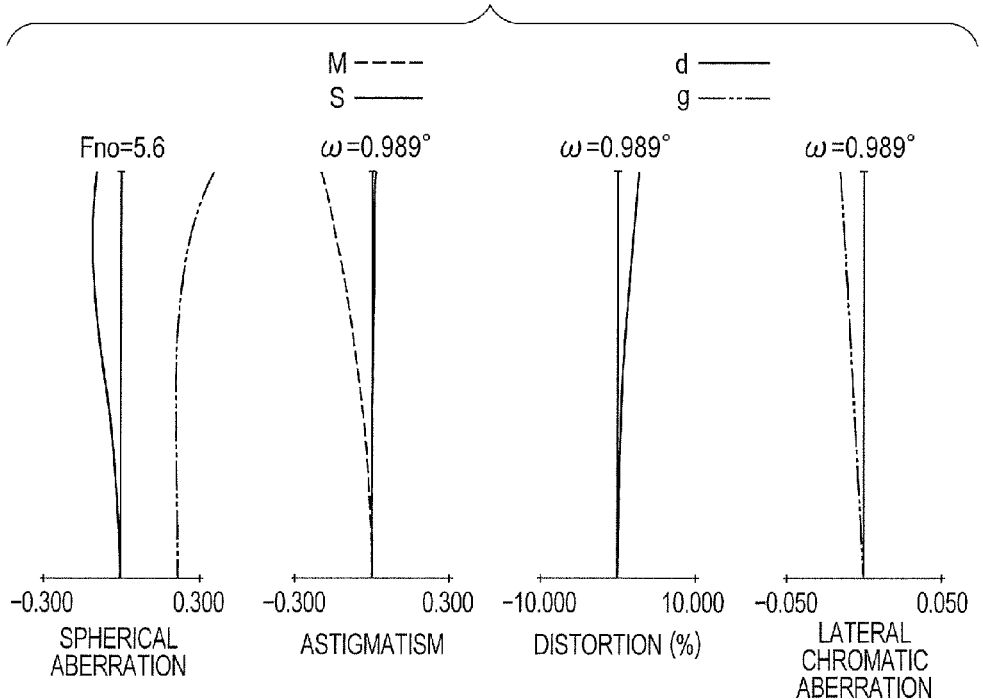
FIG. 4C is an aberration diagram at a telephoto end of the zoom lens of Embodiment 2.

FIG. 3 is a lens cross-sectional view at a wide angle end of a zoom lens according to Embodiment 2 of the present invention. FIGS. 4A, 4B, and 4C are aberration diagrams at the wide angle end, an intermediate zoom position, and a telephoto end, respectively, of the zoom lens of Embodiment 2. The zoom lens of Embodiment 2 has a zoom ratio of 39.49 and an aperture ratio (F number) of from 1.65 to 5.60.

Figure 5:
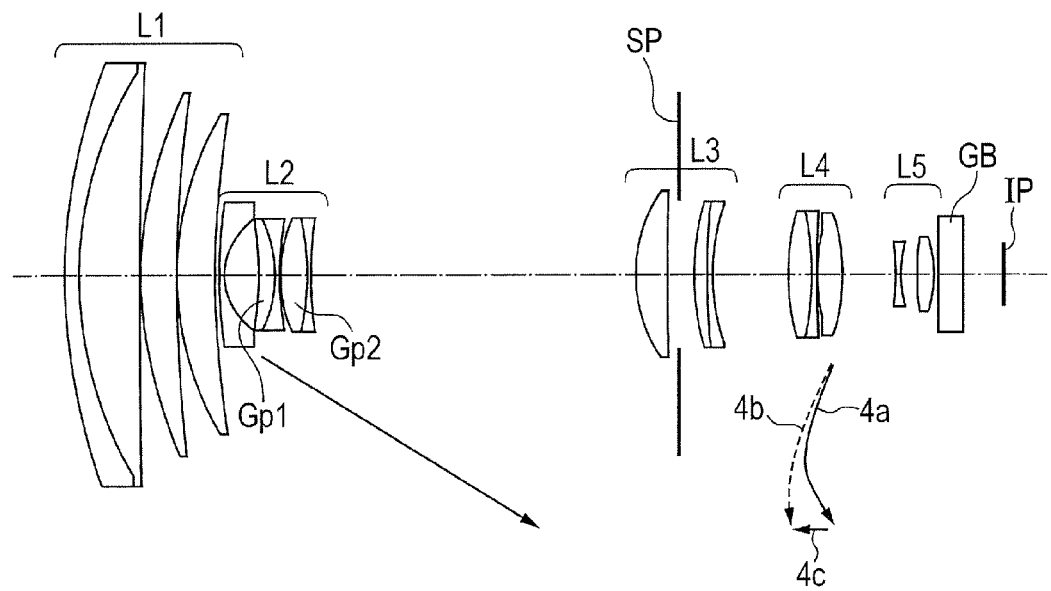
FIG. 5 is a lens cross-sectional view at a wide angle end of a zoom lens of Embodiment 3 according to the present invention.
Figure 6A:
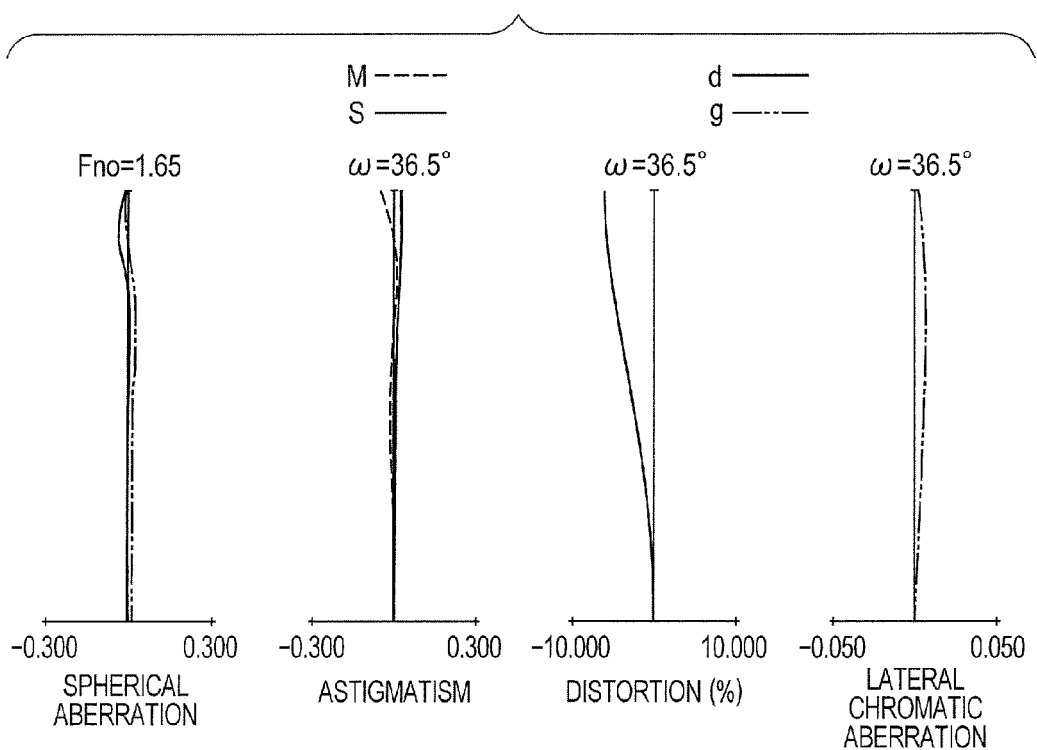
FIG. 6A is an aberration diagram at the wide angle end of the zoom lens of Embodiment 3.
Figure 6B:
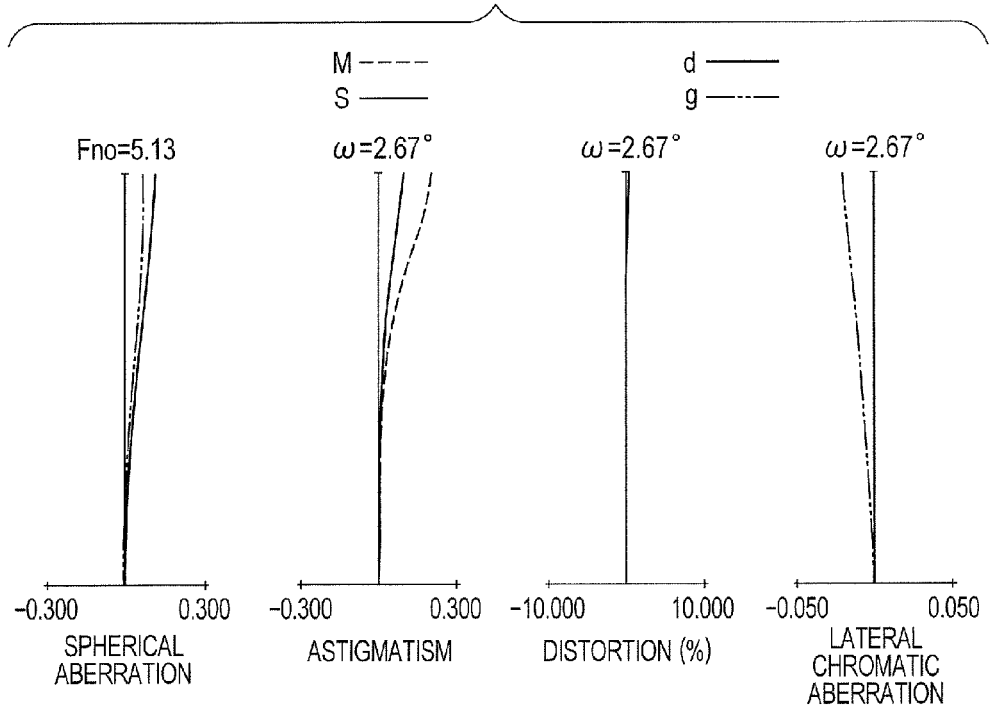
FIG. 6B is an aberration diagram at an intermediate zoom position of the zoom lens of Embodiment 3.
Figure 6C:
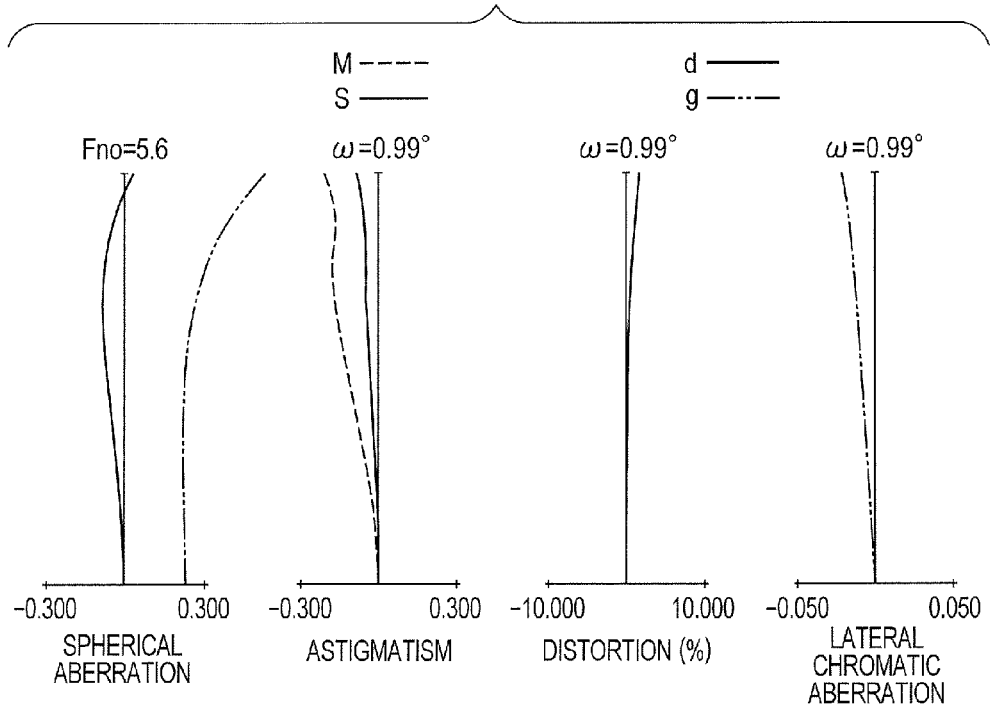
FIG. 6C is an aberration diagram at a telephoto end of the zoom lens of Embodiment 3.

FIG. 5 is a lens cross-sectional view at a wide angle end of a zoom lens according to Embodiment 3 of the present invention. FIGS. 6A, 6B, and 6C are aberration diagrams at the wide angle end, an intermediate zoom position, and a telephoto end, respectively, of the zoom lens of Embodiment 3. The zoom lens of Embodiment 3 has a zoom ratio of 39.50 and an aperture ratio (F number) of from 1.65 to 5.60.

Figure 7:
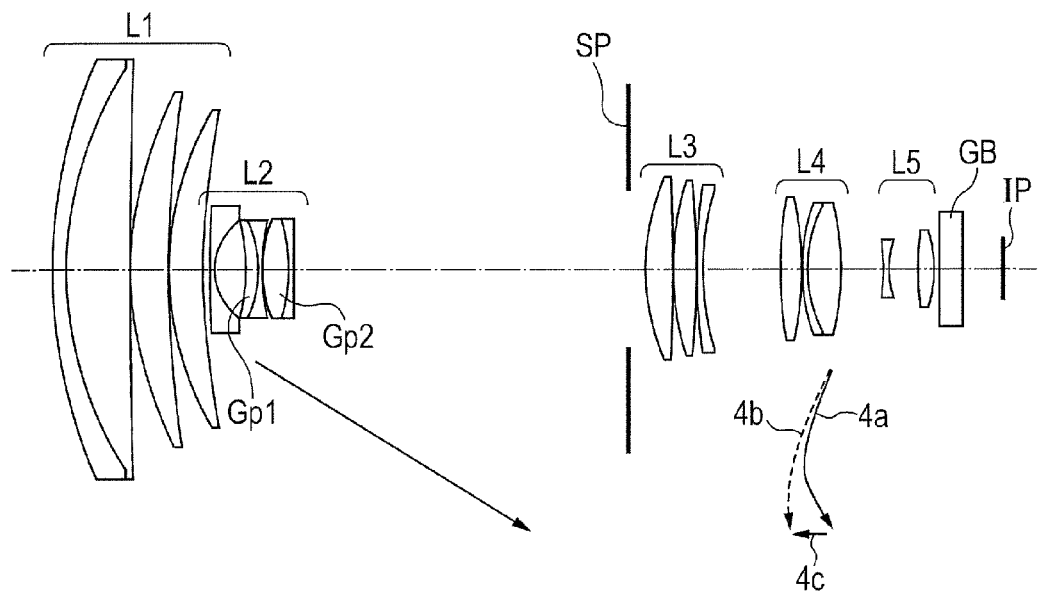
FIG. 7 is a lens cross-sectional view at a wide angle end of a zoom lens of Embodiment 4 according to the present invention.
Figure 8A:
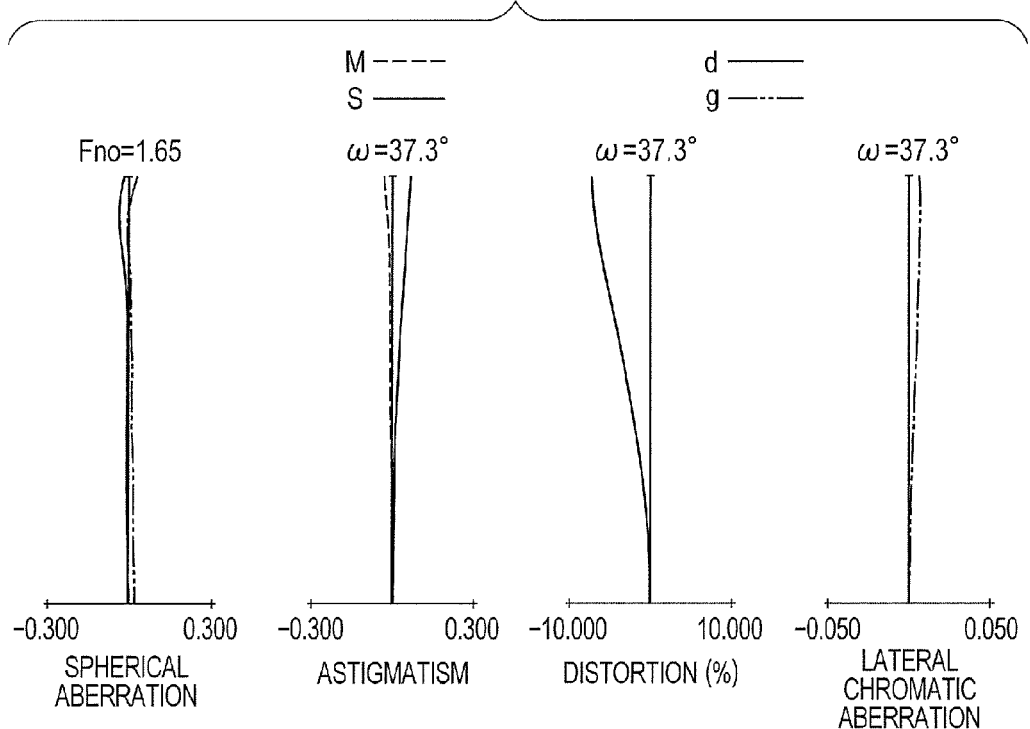
FIG. 8A is an aberration diagram at the wide angle end of the zoom lens of Embodiment 4.
Figure 8B:
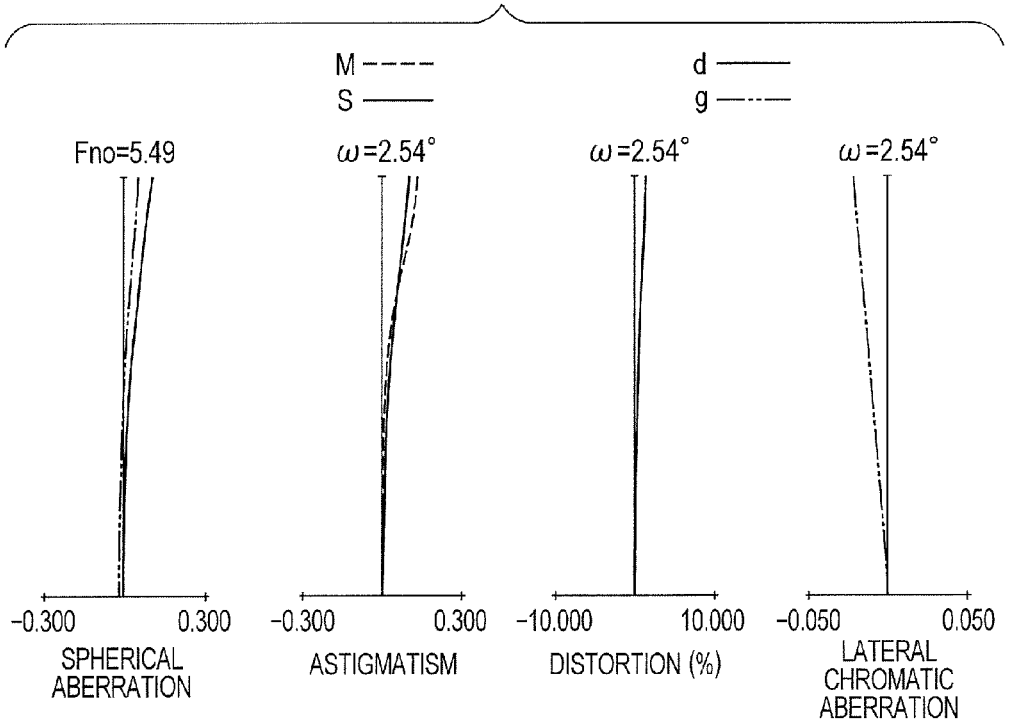
FIG. 8B is an aberration diagram at an intermediate zoom position of the zoom lens of Embodiment 4.
Figure 8C:
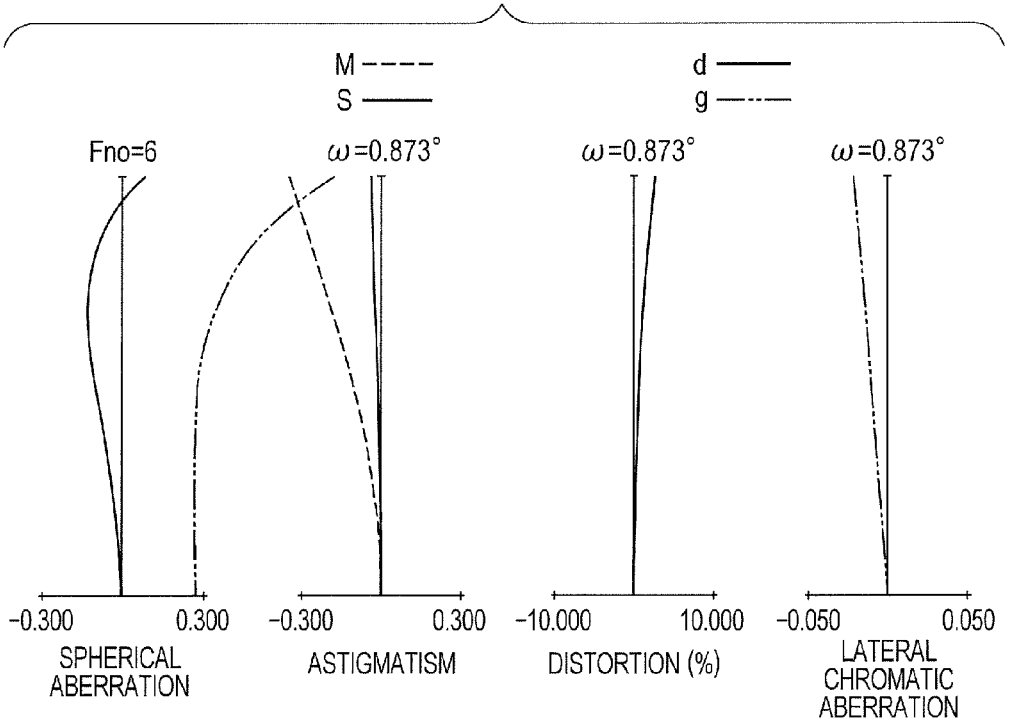
FIG. 8C is an aberration diagram at a telephoto end of the zoom lens of Embodiment 4.

FIG. 7 is a lens cross-sectional view at a wide angle end of a zoom lens according to Embodiment 4 of the present invention. FIGS. 8A, 8B, and 8C are aberration diagrams at the wide angle end, an intermediate zoom position, and a telephoto end, respectively, of the zoom lens of Embodiment 4. The zoom lens of Embodiment 4 has a zoom ratio of 45.10 and an aperture ratio (F number) of from 1.65 to 6.00.

Figure 9:
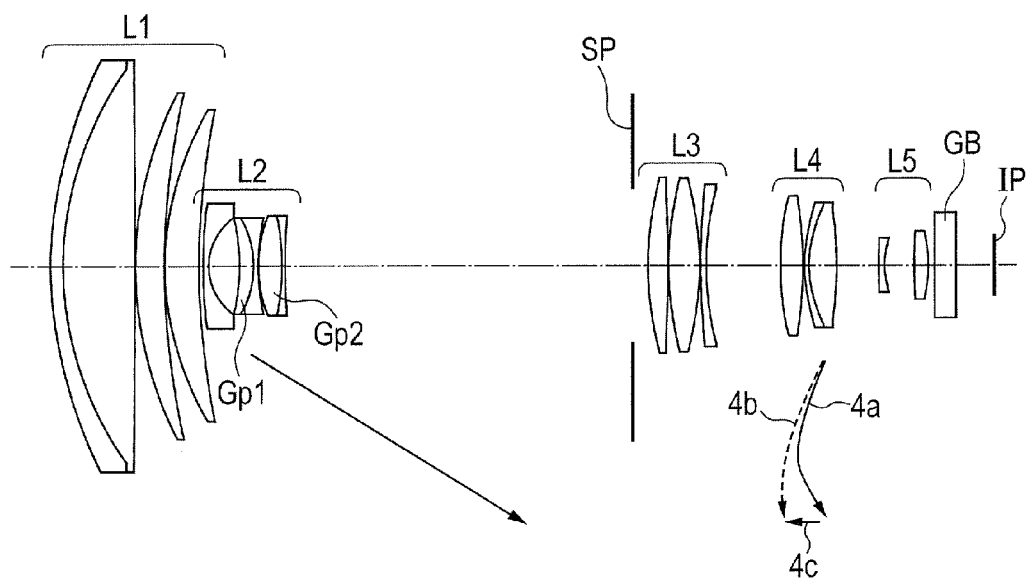
FIG. 9 is a lens cross-sectional view at a wide angle end of a zoom lens of Embodiment 5 according to the present invention.
Figure 10A:
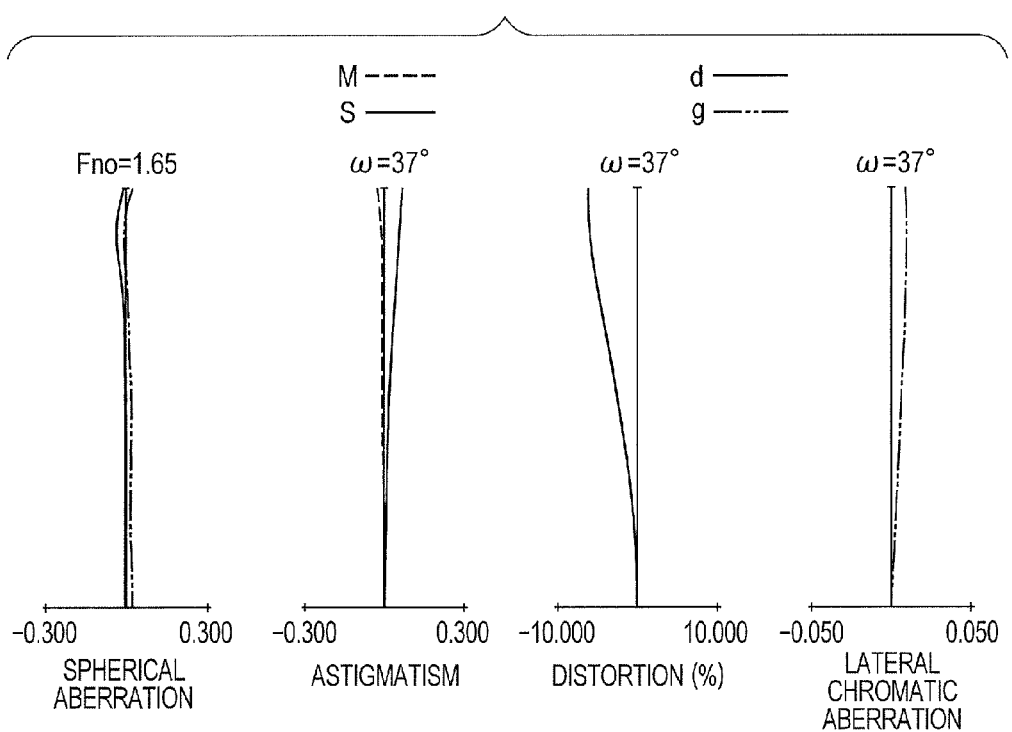
FIG. 10A is an aberration diagram at the wide angle end of the zoom lens of Embodiment 5.
Figure 10B:
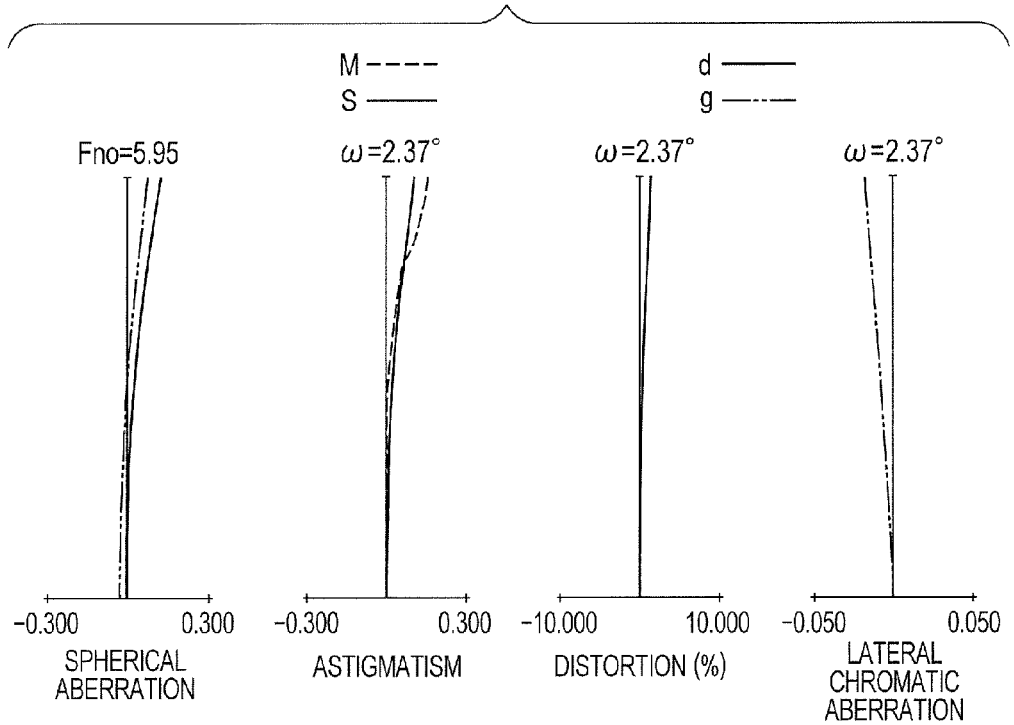
FIG. 10B is an aberration diagram at an intermediate zoom position of the zoom lens of Embodiment 5.
Figure 10C:
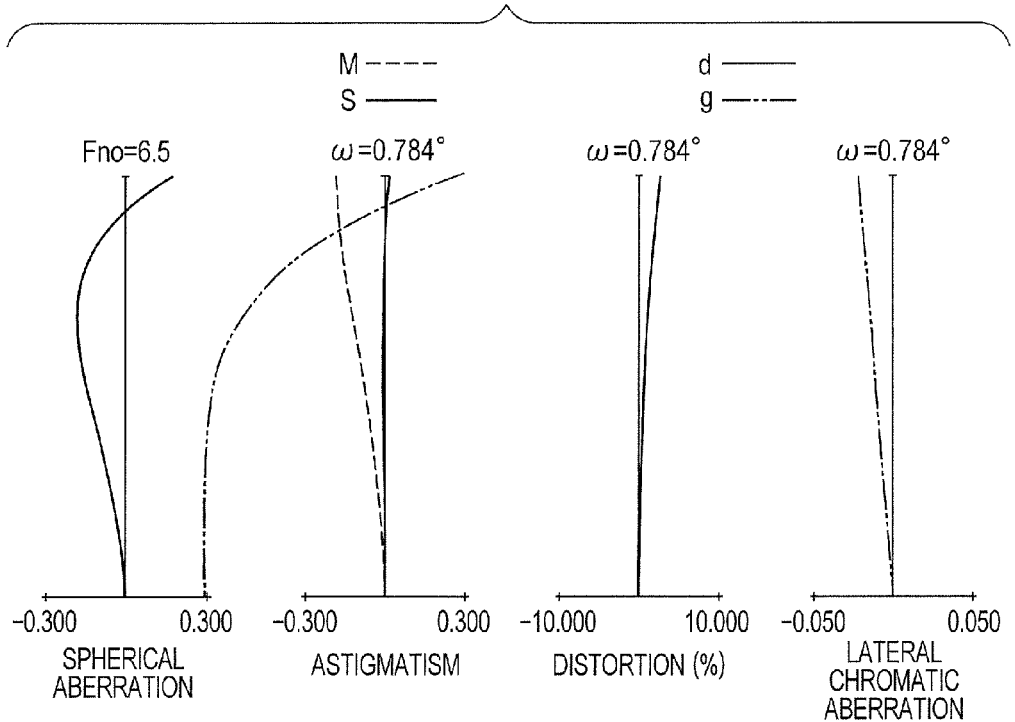
FIG. 10C is an aberration diagram at a telephoto end of the zoom lens of Embodiment 5.

FIG. 9 is a lens cross-sectional view at a wide angle end of a zoom lens according to Embodiment 5 of the present invention. FIGS. 10A, 10B, and 10C are aberration diagrams at the wide angle end, an intermediate zoom position, and a telephoto end, respectively, of the zoom lens of Embodiment 5. The zoom lens of Embodiment 5 has a zoom ratio of 50.09 and an aperture ratio (F number) of from 1.65 to 6.50.

Figure 11:
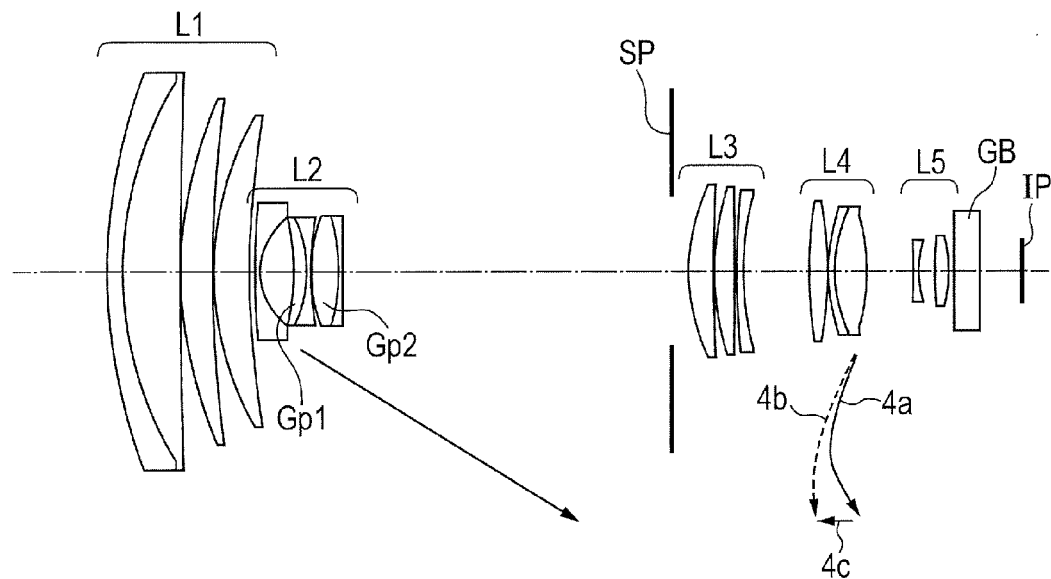
FIG. 11 is a lens cross-sectional view at a wide angle end of a zoom lens of Embodiment 6 according to the present invention.
Figure 12A:
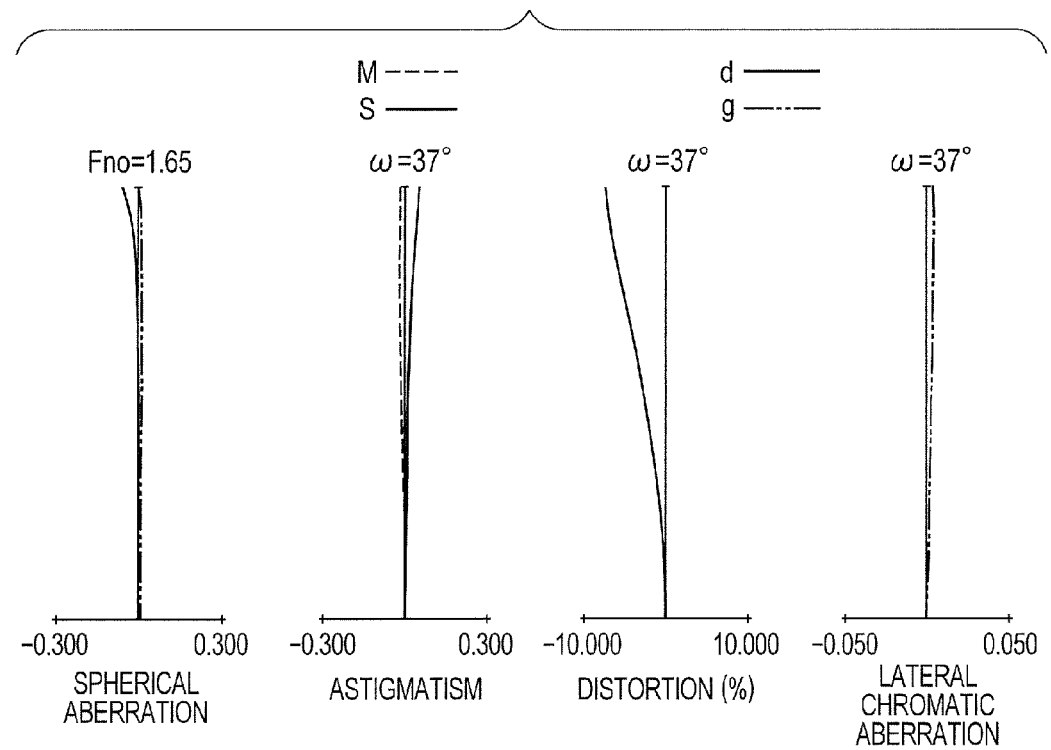
FIG. 12A is an aberration diagram at the wide angle end of the zoom lens of Embodiment 6.
Figure 12B:
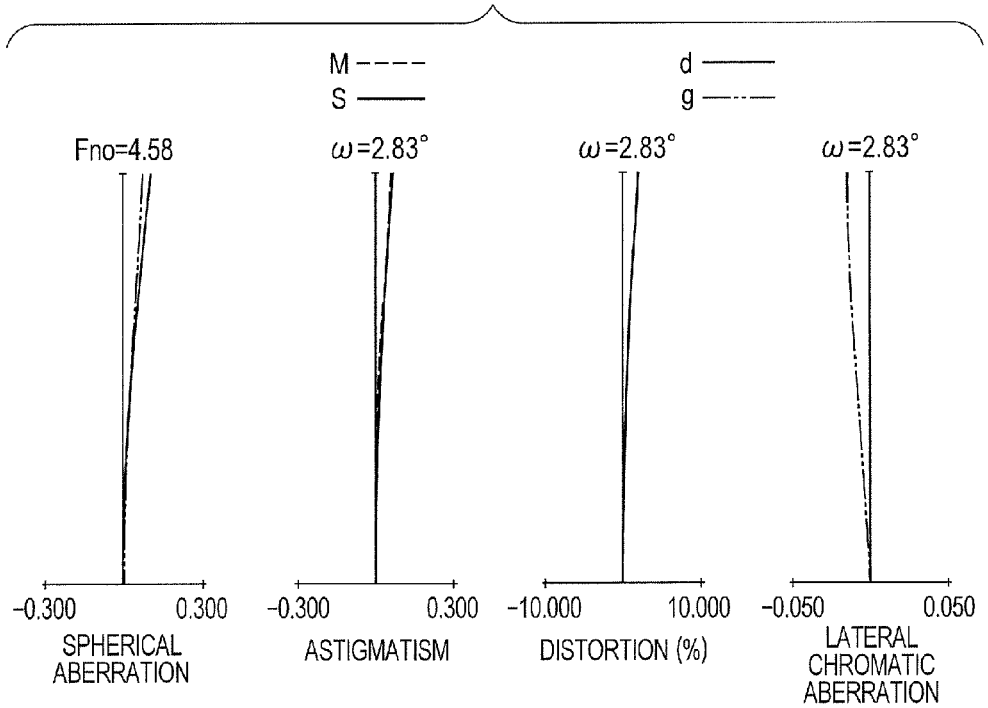
FIG. 12B is an aberration diagram at an intermediate zoom position of the zoom lens of Embodiment 6.
Figure 12C:
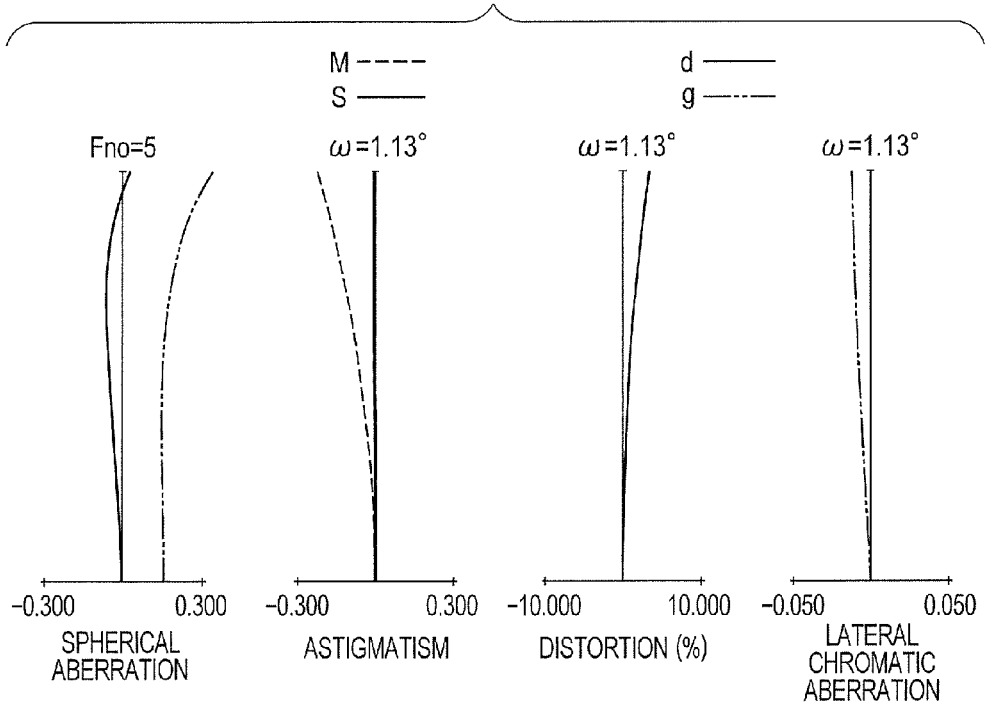
FIG. 12C is an aberration diagram at a telephoto end of the zoom lens of Embodiment 6.
Figure 13:
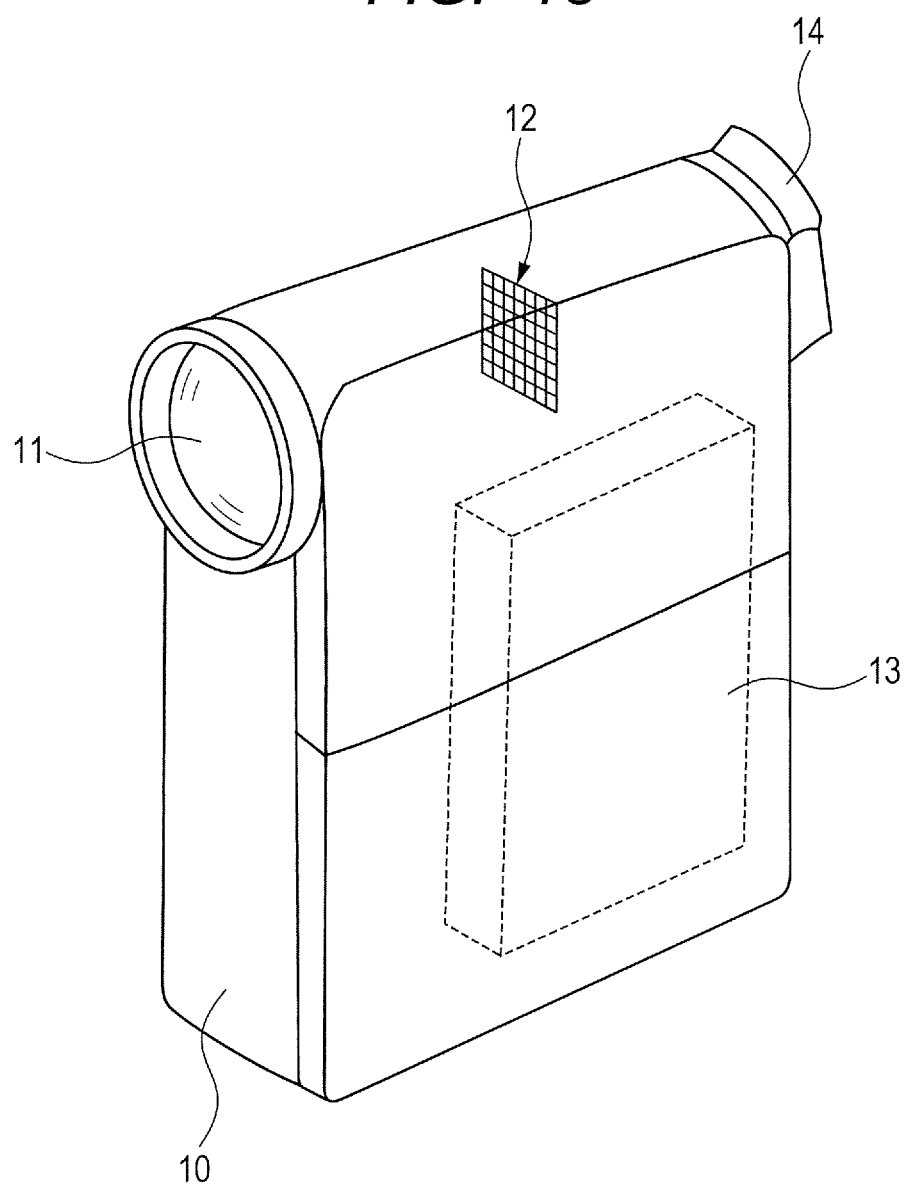
FIG. 13 is a schematic view of a main part of an image pickup apparatus according to the present invention.

FIG. 11 is a lens cross-sectional view at a wide angle end of a zoom lens according to Embodiment 6 of the present invention. FIGS. 12A, 12B, and 12C are aberration diagrams at the wide angle end, an intermediate zoom position, and a telephoto end, respectively, of the zoom lens of Embodiment 6. The zoom lens of Embodiment 6 has a zoom ratio of 34.09 and an aperture ratio (F number) of from 1.65 to 5.00. FIG. 13 is a schematic view of a main part of an image pickup apparatus according to the present invention.

The zoom lens of the present invention is used for an image pickup apparatus such as a digital camera, a video camera, and a silver-halide film camera. In the lens cross-sectional views, the left side is a front side (object side or magnification side) while the right side is a rear side (image side or reduction side). In the lens cross-sectional views, symbol i indicates an order of lens units from the object side to the image side, and symbol Li represents an i-th lens unit.

In the lens cross-sectional view of each embodiment, the zoom lens includes a first lens unit L1 having a positive refractive power, a second lens unit L2 having a negative refractive power, a third lens unit L3 having a positive refractive power, a fourth lens unit L4 having a positive refractive power, and a fifth lens unit L5 having a positive or negative refractive power. An F number determination member (hereinafter referred to also as an "aperture stop") SP has a function of aperture stop for determining (limiting) a maximum F number (Fno) light flux. The F number determination member SP is arranged on the object side of the third lens unit L3.

An optical block GB corresponds to an optical filter, a face plate, a crystal low pass filter, an infrared cut filter, or the like. As an image plane IP, an image pickup surface of an image pickup element (photoelectric transducer) such as a CCD sensor and a CMOS sensor is arranged when the zoom lens is used as an imaging optical system of a video camera and a digital still camera.

Alternatively, a photosensitive surface corresponding to a film surface is arranged when the zoom lens is used as an imaging optical system of a silver-halide film camera. A positive lens Gp1 is arranged closest to the object side among positive lenses included in the second lens unit L2. A positive lens Gp2 is arranged second when counted from the object side among the positive lenses included in the second lens unit L2.

In spherical aberration diagrams, a solid line indicates a d-line, and a two-dot chain line indicates a g-line. In astigmatism diagrams, a dotted line indicates a meridional image plane, and a solid line indicates a sagittal image plane. A lateral chromatic aberration is represented by the g-line. Symbol Fno represents an F number, and symbol ω represents a half angle of field (degree). The half angle of field ω represents a value obtained from a ray tracing value. In the lens cross-sectional views, the arrows indicate a movement locus of each of the lens units during zooming from the wide angle end to the telephoto end, and a movement direction of each of the lens units during focusing.

The wide angle end and the telephoto end respectively mean zoom positions when a magnification-varying lens unit is located at one end and the other end in a movable range thereof. In each of the embodiments, during zooming from the wide angle end to the telephoto end, the magnification is varied by moving the second lens unit L2 to the image side. In addition, image plane variation accompanying the varying magnification is corrected by moving the fourth lens unit L4 along a locus convex to the object side. In addition, a rear focus type is adopted, in which the fourth lens unit L4 is moved on the optical axis for performing focusing. A solid line curve 4a and a dotted line curve 4b concerning the fourth lens unit L4 indicate movement loci for zooming when focusing at infinity and focusing at a short distance are performed, respectively.

The fourth lens unit L4 is moved along a locus convex toward the object side, and hence a space between the third lens unit L3 and the fourth lens unit L4 can be used effectively, and the total lens length (distance from the first lens surface to the image plane) can be shortened. When focusing from infinity to a short distance is performed at the telephoto end, the fourth lens unit L4 is moved to the front side as indicated by an arrow 4c. The aperture stop SP does not move during zooming.

The zoom lens of each of the embodiments includes, in order from the object side to the image side, the first lens unit L1 having the positive refractive power, the second lens unit L2 having the negative refractive power, the third lens unit L3 having the positive refractive power, the fourth lens unit L4 having the positive refractive power, and the fifth lens unit L5 having the positive or negative refractive power. By adopting this configuration, the downsizing and the high zoom ratio of the entire system are ensured. Note that, the fifth lens unit L5 has the negative refractive power in Numerical Embodiments 1 to 6, but the same effect is obtained even when the fifth lens unit L5 has the positive refractive power.

During zooming from the wide angle end to the telephoto end, the first lens unit L1, the third lens unit L3, and the fifth lens unit L5 do not move. Only the two lens units move during at least one of the zooming and the focusing. In this way, the movement mechanism is simplified and the entire zoom lens can be downsized. In particular, the first lens unit L1 having the largest lens effective diameter is configured not to move for zooming, with the result that the entire system becomes easy to downsize.

The second lens unit L2 having the negative refractive power is structured to have at least three negative lenses and at least two positive lenses, with the result that each lens has a lens shape that is easy to manufacture. Moreover, an axial chromatic aberration and the lateral chromatic aberration, variations in the chromatic aberrations accompanying zooming, and the like are appropriately shared by the respective positive lenses to be corrected satisfactorily.

The positive lens Gp1, which is arranged closest to the object side among the positive lenses included in the second lens unit L2, has a meniscus shape having a concave surface facing the object side. In addition, the positive lens Gp1 is arranged between the negative lens that is arranged closest to the object side among the negative lenses included in the second lens unit L2 and the negative lens that is arranged second when counted from the object side. In this manner, the second lens unit L2 becomes easy to downsize while correcting the chromatic aberrations and a field curvature satisfactorily.

A focal length of the entire system at the wide angle end is denoted by fw, a focal length of the second lens unit L2 is denoted by f2, a focal length of the positive lens Gp1 is denoted by fp1, and a focal length of the positive lens Gp2, which is arranged second when counted from the object side of the positive lenses included in the second lens unit L2 is denoted by fp2. Then, the following conditional expressions are satisfied:

$$1.2 < fp1/fp2 < 3.0 \quad (1);$$

$$2.5 < |fp1/f2| < 5.0 \quad (2); \text{ and}$$

$$0.9 < |f2/fw| < 2.0 \quad (3).$$

Next, the technical meanings of Conditional Expressions (1) to (3) are described. Conditional Expression (1) defines a ratio of the focal length of the positive lens Gp2 to the focal length of the positive lens Gp1. When a power (refractive power) of the positive lens Gp1 becomes weak and exceeds an upper limit of Conditional Expression (1), the lateral chromatic aberration becomes difficult to correct at the wide angle end, and the variations in chromatic aberrations accompanying zooming become difficult to correct. When a power of the positive lens Gp2 becomes weak and exceeds a lower limit of Conditional Expression (1), the axial chromatic aberration and the field curvature become difficult to correct.

Conditional Expression (2) defines an absolute value of a ratio of the focal length of the second lens unit L2 to the focal length of the positive lens Gp1. When the power of the positive lens Gp1 becomes weak and exceeds an upper limit of Conditional Expression (2), the lateral chromatic aberration at the wide angle end and the variations in chromatic aberrations accompanying zooming become difficult to correct. When the negative refractive power of the second lens unit L2 becomes weak (the absolute value of the negative refractive power becomes small) and exceeds a lower limit of Conditional Expression (2), in order to obtain a desired zoom ratio, a movement amount of the second lens unit L2 during zooming becomes large. As a result, the total lens length (length from the first lens surface to the image plane) becomes inadvantageously long.

Conditional Expression (3) defines an absolute value of a ratio of the focal length of the zoom lens at the wide angle end to the focal length of the second lens unit L2. When the negative refractive power of the second lens unit L2 becomes weak and exceeds an upper limit of Conditional Expression (3), in order to obtain the desired zoom ratio, the movement amount of the second lens unit L2 during zooming becomes large, and the total lens length increases. When the refractive power of the second lens unit L2 becomes strong (the absolute value of the negative refractive power becomes large) and exceeds a lower limit of Conditional Expression (3), a Petzval sum negatively increases, and the field curvature becomes difficult to correct. It is more preferred to set the numerical value ranges of Conditional Expressions (1) to (3) as follows:

$$1.5 < fp1/fp2 < 2.8 \quad (1a)$$

$$3.0 < |fp1/f2| < 4.5 \quad (2a)$$

$$1.2 < |f2/fw| < 0.5 \quad (3a)$$

By adopting the configuration described above, the zoom lens is obtained, which is compact in the entire system and which has the high zoom ratio and the high optical performance over the entire zoom range. However, it is more preferred to satisfy at least one of the following conditional expressions.

The movement amount of the second lens unit L2 during zooming from the wide angle end to the telephoto end is represented by BL2str. Herein, the movement amount means a difference between a position on the optical axis of the lens unit at the wide angle end and a position on the optical axis of the lens unit at the telephoto end. The sign of the movement amount is set positive when the lens unit is located on the image side at the telephoto end with respect to the wide angle end, and is set negative when the lens unit is located on the object side at the telephoto end with respect to the wide angle end. In other words, the sign is set positive when the lens unit moves to the image side during zooming from the wide angle end to the telephoto end, and is set negative when the lens unit moves to the object side. At this time, it is preferred to satisfy at least one of the following conditional expressions:

$$1.3<|fp2/f2|<2.3 \quad (4); \text{ and}$$

$$4.0<BL2str/|f2|<10.0 \quad (5).$$

Next, the technical meanings of Conditional Expressions (4) and (5) are described. Conditional Expression (4) defines an absolute value of a ratio of the focal length of the second lens unit L2 to the focal length of the positive lens Gp2. When the power of the positive lens Gp2 becomes too weak and exceeds an upper limit of Conditional Expression (4), the axial chromatic aberration and the field curvature become difficult to correct. When the negative refractive power of the second lens unit L2 becomes too weak and exceeds a lower limit of Conditional Expression (4), in order to obtain the desired zoom ratio, the movement amount of the second lens unit L2 during zooming becomes large, and the total lens length increases.

Conditional Expression (5) defines a ratio of the focal length of the second lens unit L2 to the movement amount of the second lens unit L2 during zooming. When the movement amount of the second lens unit L2 becomes large and exceeds an upper limit of Conditional Expression (5), the total lens length increases. When the movement amount of the second lens unit L2 becomes small and exceeds a lower limit of Conditional Expression (5), the desired zoom ratio becomes difficult to obtain. Note that, it is more preferred to set the numerical value ranges of Conditional Expressions (4) and (5) as follows:

$$1.5<|fp2/f2|<2.1 \quad (4a); \text{ and}$$

$$4.2<BL2str/|f2|<8.0 \quad (5a).$$

As described above, according to each of the embodiments, it is possible to obtain the zoom lens having the high zoom ratio, the entire system of which is compact, has the high optical performance over the entire zoom range, and is easy to adapt to a larger image pickup element.

According to each of the embodiments, the second lens unit L2 consists of, in order from the object side to the image side, a negative lens having a concave surface on the image side, the positive meniscus lens having the concave surface facing the object side, a biconcave negative lens, a positive lens having a convex surface on the object side, and a negative lens. Such structure is adopted to correct the field curvature, the axial chromatic aberration, the lateral chromatic aberration, the variations in chromatic aberrations during zooming, and the like satisfactorily without making the total lens thickness of the second lens unit L2 excessively long, and to make the entire system easy to downsize.

The fourth lens unit L4 consists of, in order from the object side to the image side, a positive lens, and a cemented lens which is obtained by cementing a negative lens and a positive lens. Alternatively, the fourth lens unit L4 consists of a cemented lens which is obtained by cementing a positive lens and a negative lens, and a positive lens. In this manner, the aberration variations during zooming and focusing are easily reduced. The first lens unit L1 consists of, in order from the object side to the image side, a cemented lens which is obtained by cementing a negative lens and a positive lens, a positive lens, and a positive lens. The third lens unit L3 consists of, in order from the object side to the image side, a positive lens, a positive lens, and a negative lens. The fifth lens unit L5 consists of, in order from the object side to the image side, a negative lens and a positive lens.

Each of the lens units is structured as described above to obtain the high optical performance over the entire zoom range.

Next, a video camera (image pickup apparatus) including the zoom lens of the present invention as an imaging optical system according to the present invention is described with reference to FIG. 13. In FIG. 13, the video camera includes a video camera main body 10, an imaging optical system 11 including the zoom lens of the present invention, an image pickup element 12 such as a CCD for receiving light of a subject image by the imaging optical system 11, and a recording unit 13 for recording the subject image received by the image pickup element 12. A finder 14 is used for observing the subject image displayed on a display element (not shown). The display element includes a liquid crystal panel and the like, and the subject image formed on the image pickup element 12 is displayed on the display element.

By applying the zoom lens of the present invention to the video camera in such a manner, the compact image pickup apparatus having the high optical performance can be realized. Note that, if a solid-state image pickup element such as a CCD is used as the image pickup element, the aberration is electronically corrected, to thereby enable the image quality of the output image to be more enhanced.

Although the exemplary embodiments of the present invention have been described so far, the present invention is by no means limited to those embodiments, and hence various changes and modifications can be made within the scope of the subject matter of the present invention. As described above, according to the embodiments of the present invention, the zoom lens which is compact in the entire system, and which has the high zoom ratio and the high optical performance over the entire zoom range, and the image pickup apparatus which includes the zoom lens and is compatible with a larger image pickup element can be obtained.

Next, Numerical Embodiments 1 to 6 are described, which correspond to Embodiments 1 to 6 of the present invention, respectively. In each of Numerical Embodiments 1 to 6, symbol i represents the order of a surface from an object. Symbol ri represents a curvature radius of an i-th surface in order from the object side, symbol di represents a lens thickness or an air gap between an i-th surface and an (i+1)th surface in order from the object side, and symbols ndi and vdi represent a refractive index and an Abbe number of a material of an optical member between the i-th surface and the (i+1)th surface in order from the object side, respectively. In addition, two surfaces closest to the image side are made of a glass material such as a face plate. An aspherical shape is expressed by the expression below.

$$X = \frac{\frac{H^2}{R}}{1+\sqrt{1-(1+K)\left(\frac{H}{R}\right)^2}} + A4H^4 + A6H^6 + A8H^8 + A10H^{10}$$

where the X axis corresponds to the optical axis direction, the H axis corresponds to the direction perpendicular to the optical axis, the light propagation direction is positive, symbol R represents a paraxial curvature radius, symbol K represents a conic constant, and symbols A4, A6, A8, and A10 represent aspherical surface coefficients, respectively.

In addition, * means a surface having an aspherical shape, and [e-x] means $10^{-x}$. Symbol BF is back focus, which is represented by an air-converted length from a final lens surface to an image plane. A calculation result of each of the conditional expressions based on each of the Numerical Embodiments is shown in Table 1.

[Numerical Embodiment 1]

Unit: mm

Surface data

| Surface number | ri | Di | ndii | vdi |
|---|---|---|---|---|
| 1 | 65.262 | 1.30 | 1.85478 | 24.8 |
| 2 | 39.039 | 5.29 | 1.49700 | 81.5 |
| 3 | 880.122 | 0.10 | | |
| 4 | 41.278 | 3.36 | 1.49700 | 81.5 |
| 5 | 152.845 | 0.10 | | |
| 6 | 28.647 | 3.25 | 1.58694 | 71.0 |
| 7 | 69.803 | (Variable) | | |
| 8 | 88.111 | 0.45 | 2.00100 | 29.1 |
| 9 | 6.140 | 2.90 | | |
| 10 | −18.672 | 1.42 | 1.95796 | 17.3 |
| 11 | −9.198 | 0.40 | 2.00102 | 29.8 |
| 12 | 33.629 | 0.10 | | |
| 13 | 16.312 | 2.07 | 1.95906 | 17.5 |
| 14 | −24.890 | 0.40 | 2.00455 | 29.1 |
| 15 | 13419.812 | (Variable) | | |
| 16 (Stop) | ∞ | 1.50 | | |
| 17* | 15.180 | 3.04 | 1.69350 | 53.2 |
| 18* | −1969.691 | 0.10 | | |
| 19 | 24.045 | 2.01 | 1.49672 | 81.5 |
| 20 | 441.654 | 0.10 | | |
| 21 | 32.050 | 0.60 | 1.98036 | 21.9 |
| 22 | 18.046 | (Variable) | | |
| 23* | 31.212 | 1.22 | 1.55332 | 71.7 |
| 24 | −98.288 | 0.10 | | |
| 25 | 16.868 | 0.50 | 1.95906 | 17.5 |
| 26 | 12.489 | 2.81 | 1.49700 | 81.5 |
| 27 | −24.060 | (Variable) | | |
| 28 | −32.610 | 0.50 | 1.94026 | 35.6 |
| 29 | 10.653 | 2.02 | | |
| 30 | 29.525 | 1.07 | 1.80897 | 22.6 |
| 31 | −26.791 | 0.50 | | |
| 32 | ∞ | 2.20 | 1.51600 | 64.2 |
| 33 | ∞ | 3.89 | | |
| Image plane | ∞ | | | |

Aspherical surface data

Seventeenth surface

K = 0.00000e+000 A4 = −4.38453e−005 A6 = −2.40441e−007
A8 = 2.40506e−010 A10 = −1.16249e−011
Eighteenth surface K = 0.00000e+000 A4 = 8.67343e−006 A6 = −1.80311e−007
Twenty-third surface K = 0.00000e+000 A4 = −1.13076e−004 A6 = −4.92731e−007
A8 = 1.22044e−008 A10 = 4.38368e−011

Various data
Zoom ratio 39.50

| | Wide angle | Intermediate | Telephoto |
|---|---|---|---|
| Focal length | 4.28 | 62.64 | 168.90 |
| F number | 1.65 | 5.13 | 5.60 |
| Half angle of field (degree) | 35.05 | 2.74 | 1.02 |
| Image height | 3.00 | 3.00 | 3.00 |
| Total lens length | 85.53 | 85.53 | 85.53 |
| BF | 5.84 | 5.84 | 5.84 |
| d7 | 0.65 | 26.53 | 30.06 |
| d15 | 29.60 | 3.73 | 0.20 |
| d22 | 8.28 | 3.00 | 11.41 |
| d27 | 3.62 | 8.90 | 0.49 |

Unit: mm

Zoom lens unit data

| Unit | First surface | Focal length |
|---|---|---|
| 1 | 1 | 41.56 |
| 2 | 8 | −5.36 |
| 3 | 16 | 21.76 |
| 4 | 24 | 16.19 |
| 5 | 29 | −22.47 |

[Numerical Embodiment 2]

Unit: mm

Surface data

| Surface number | ri | di | ndi | vdi |
|---|---|---|---|---|
| 1 | 64.743 | 1.30 | 1.85478 | 24.8 |
| 2 | 39.039 | 5.31 | 1.49700 | 81.5 |
| 3 | 1082.905 | 0.10 | | |
| 4 | 41.036 | 3.37 | 1.49700 | 81.5 |
| 5 | 155.293 | 0.10 | | |
| 6 | 28.575 | 3.23 | 1.57595 | 73.2 |
| 7 | 70.577 | (Variable) | | |
| 8 | 107.817 | 0.45 | 2.00100 | 29.1 |
| 9 | 6.284 | 2.86 | | |
| 10 | −17.096 | 1.38 | 1.96260 | 17.2 |
| 11 | −9.005 | 0.40 | 1.99702 | 30.2 |
| 12 | 38.879 | 0.10 | | |
| 13 | 17.364 | 2.08 | 1.95906 | 17.5 |
| 14 | −21.471 | 0.40 | 1.99947 | 29.7 |
| 15 | 64286.794 | (Variable) | | |
| 16 (Stop) | ∞ | 1.50 | | |
| 17* | 15.571 | 2.97 | 1.69350 | 53.2 |
| 18* | −1612.945 | 0.10 | | |
| 19 | 25.010 | 1.94 | 1.53826 | 75.9 |
| 20 | 357.658 | 0.10 | | |
| 21 | 30.103 | 0.60 | 1.98074 | 21.8 |
| 22 | 18.142 | (Variable) | | |
| 23* | 28.511 | 1.31 | 1.55332 | 71.7 |
| 24 | −105.864 | 0.10 | | |
| 25 | 17.838 | 0.50 | 1.95906 | 17.5 |
| 26 | 12.863 | 2.69 | 1.49700 | 81.5 |
| 27 | −25.752 | (Variable) | | |
| 28 | −20.696 | 0.50 | 1.97085 | 33.1 |
| 29 | 9.557 | 2.24 | | |
| 30 | 16.480 | 1.74 | 1.71139 | 29.5 |
| 31 | −14.202 | 0.50 | | |
| 32 | ∞ | 2.20 | 1.51600 | 64.2 |
| 33 | ∞ | 3.89 | | |
| Image plane | ∞ | | | |

Aspherical surface data

Seventeenth surface

K = 0.00000e+000 A4 = −4.05207e−005 A6 = −2.89504e−007
A8 = 1.24205e−009 A10 = −1.81816e−011
Eighteenth surface K = 0.00000e+000 A4 = 9.69470e−006 A6 = −1.98038e−007
Twenty-third surface K = 0.00000e+000 A4 = −1.08769e−004 A6 = 4.01759e−007
A8 = −2.93577e−008 A10 = 6.47990e−010

Various data
Zoom ratio 39.49

| | Wide angle | Intermediate | Telephoto |
|---|---|---|---|
| Focal length | 4.28 | 63.65 | 168.87 |
| F number | 1.65 | 5.13 | 5.60 |
| Half angle of field (degree) | 35.05 | 2.70 | 1.02 |

Unit: mm

| | | | |
|---|---|---|---|
| Image height | 3.00 | 3.00 | 3.00 |
| Total lens length | 85.79 | 85.79 | 85.79 |
| BF | 5.84 | 5.84 | 5.84 |
| d7 | 0.69 | 26.25 | 29.74 |
| d15 | 30.05 | 4.48 | 1.00 |
| d22 | 8.06 | 2.56 | 11.23 |
| d27 | 3.78 | 9.28 | 0.61 |

Zoom lens unit data

| Unit | First surface | Focal length |
|---|---|---|
| 1 | 1 | 41.19 |
| 2 | 8 | −5.27 |
| 3 | 16 | 21.24 |
| 4 | 23 | 16.71 |
| 5 | 28 | −51.61 |

[Numerical Embodiment 3]

Unit: mm
Surface data

| Surface number | ri | di | ndi | vdi |
|---|---|---|---|---|
| 1 | 55.318 | 1.30 | 2.00069 | 25.5 |
| 2 | 36.090 | 5.65 | 1.43875 | 94.9 |
| 3 | 615.719 | 0.10 | | |
| 4 | 40.208 | 3.31 | 1.57424 | 71.3 |
| 5 | 130.202 | 0.10 | | |
| 6 | 30.004 | 3.39 | 1.59522 | 67.7 |
| 7 | 84.292 | (Variable) | | |
| 8 | 64.552 | 0.45 | 2.00100 | 29.1 |
| 9 | 6.402 | 3.08 | | |
| 10 | −29.516 | 1.54 | 1.95906 | 17.5 |
| 11 | −11.005 | 0.40 | 2.00100 | 29.1 |
| 12 | 30.958 | 0.10 | | |
| 13 | 14.236 | 2.35 | 1.95906 | 17.5 |
| 14 | −27.994 | 0.40 | 1.99851 | 29.5 |
| 15 | 42.469 | (Variable) | | |
| 16* | 14.891 | 2.85 | 1.76802 | 49.2 |
| 17 | −87732.959 | 1.00 | | |
| 18 (Stop) | ∞ | 1.50 | | |
| 19* | 24.274 | 1.15 | 1.55332 | 71.7 |
| 20 | 86.770 | 0.60 | 2.00108 | 25.5 |
| 21 | 22.150 | (Variable) | | |
| 22 | 20.578 | 2.18 | 1.49700 | 81.5 |
| 23 | −30.515 | 0.50 | 1.97380 | 20.2 |
| 24 | 250.872 | 0.10 | | |
| 25* | 22.341 | 2.21 | 1.76802 | 49.2 |
| 26* | −21.274 | (Variable) | | |
| 27 | −17.195 | 0.50 | 2.00100 | 29.1 |
| 28 | 11.648 | 1.45 | | |
| 29 | 21.034 | 1.50 | 1.82115 | 24.1 |
| 30* | −15.279 | 0.50 | | |
| 31 | ∞ | 2.20 | 1.51600 | 64.2 |
| 32 | ∞ | 3.89 | | |
| Image plane | ∞ | | | |

Aspherical surface data

Sixteenth surface

K = −1.41886e+000 A4 = 4.53385e−005 A6 = −3.73336e−007
A8 = 9.91428e−011 A10 = 2.73869e−011

Ninteenth surface

K = −5.19472e+000 A4 = −5.69575e−005 A6 = 1.13763e−006
A8 = 1.15575e−008 A10 = −3.74154e−010

Twenty-fifth surface

K = −4.64870e+000 A4 = 8.09062e−005 A6 = −1.01317e−005
A8 = −1.19226e−007

Unit: mm

Twenty-sixth surface

K = 0.00000e+000 A4 = 1.70910e−004 A6 = −1.49125e−005
A8 = 5.11242e−008

Thirtieth surface

K = −2.20777e+001 A4 = −9.66161e−004 A6 = 4.40442e−005
A8 = −2.03621e−006 A10 = 6.01770e−008

Various data
Zoom ratio 39.50

| | Wide angle | Intermediate | Telephoto |
|---|---|---|---|
| Focal length | 4.32 | 64.11 | 170.55 |
| F number | 1.65 | 5.13 | 5.60 |
| Half angle of field (degree) | 34.79 | 2.68 | 1.01 |
| Image height | 3.00 | 3.00 | 3.00 |
| Total lens length | 85.33 | 85.33 | 85.33 |
| BF | 5.84 | 5.84 | 5.84 |
| d7 | 0.50 | 25.93 | 29.40 |
| d15 | 29.60 | 4.17 | 0.70 |
| d21 | 6.86 | 1.91 | 11.20 |
| d26 | 4.83 | 9.79 | 0.50 |

Zoom lens unit data

| Unit | First surface | Focal length |
|---|---|---|
| 1 | 1 | 41.15 |
| 2 | 8 | −5.55 |
| 3 | 16 | 24.36 |
| 4 | 22 | 14.00 |
| 5 | 27 | −36.42 |

[Numerical Embodiment 4]

Unit: mm
Surface data

| Surface number | ri | di | ndi | vdi |
|---|---|---|---|---|
| 1 | 51.137 | 1.30 | 2.00069 | 25.5 |
| 2 | 35.673 | 6.14 | 1.48675 | 94.9 |
| 3 | 940.518 | 0.10 | | |
| 4 | 37.403 | 3.52 | 1.49700 | 81.5 |
| 5 | 113.809 | 0.10 | | |
| 6 | 30.837 | 3.20 | 1.58008 | 69.9 |
| 7 | 77.739 | (Variable) | | |
| 8 | 93.819 | 0.45 | 2.00100 | 29.1 |
| 9 | 6.025 | 2.93 | | |
| 10 | −20.462 | 1.20 | 1.95906 | 17.5 |
| 11 | −10.850 | 0.40 | 2.00100 | 29.1 |
| 12 | 31.307 | 0.10 | | |
| 13 | 15.574 | 2.42 | 1.95906 | 17.5 |
| 14 | −17.018 | 0.40 | 2.00100 | 29.1 |
| 15 | 303.514 | (Variable) | | |
| 16 (Stop) | ∞ | 1.50 | | |
| 17* | 19.521 | 2.62 | 1.76802 | 49.2 |
| 18* | −262.374 | 0.10 | | |
| 19 | 31.981 | 2.09 | 1.43875 | 94.9 |
| 20 | −125.498 | 0.10 | | |
| 21 | 62.338 | 0.60 | 2.00085 | 27.0 |
| 22 | 28.231 | (Variable) | | |
| 23* | 27.479 | 2.00 | 1.55332 | 71.7 |
| 24 | −36.135 | 0.10 | | |
| 25 | 19.362 | 0.50 | 1.95906 | 17.5 |
| 26 | 13.275 | 3.31 | 1.43875 | 94.9 |
| 27 | −20.685 | (Variable) | | |
| 28 | −19.242 | 0.50 | 1.99470 | 29.8 |
| 29 | 9.713 | 2.73 | | |
| 30 | 63.453 | 1.54 | 1.79967 | 23.4 |
| 31 | −10.703 | 0.50 | | |
| 32 | ∞ | 2.20 | 1.51600 | 64.2 |

Unit: mm

| | | |
|---|---|---|
| 33 | ∞ | 3.89 |
| Image plane | ∞ | |

Aspherical surface data

Seventeenth surface

K = 0.00000e+000 A4 = −5.03953e−005 A6 = −4.92406e−008
A8 = −1.05869e−009 A10 = 5.12446e−012
Eighteenth surface K = 0.00000e+000 A4 = −1.73548e−005 A6 = 2.77479e−008
Twenty-third surface K = 0.00000e+000 A4 = −1.17013e−004 A6 = −2.47915e−007
A8 = 2.15325e−008 A10 = −2.20682e−010

Various data
Zoom ratio 45.10

| | Wide angle | Intermediate | Telephoto |
|---|---|---|---|
| Focal length | 4.24 | 66.70 | 191.14 |
| F number | 1.65 | 5.49 | 6.00 |
| Half angle of field (degree) | 35.29 | 2.58 | 0.90 |
| Image height | 3.00 | 3.00 | 3.00 |
| Total lens length | 89.38 | 89.38 | 89.38 |
| BF | 5.84 | 5.84 | 5.84 |
| d7 | 0.64 | 27.37 | 31.01 |
| d15 | 31.57 | 4.84 | 1.20 |
| d22 | 7.36 | 2.38 | 10.82 |
| d27 | 4.01 | 8.99 | 0.55 |

Zoom lens unit data

| Unit | First surface | Focal length |
|---|---|---|
| 1 | 1 | 42.76 |
| 2 | 8 | −5.26 |
| 3 | 16 | 23.70 |
| 4 | 23 | 15.67 |
| 5 | 28 | −47.21 |

[Numerical Embodiment 5]

Unit: mm

Surface data

| Surface number | ri | di | ndi | vdi |
|---|---|---|---|---|
| 1 | 48.337 | 1.30 | 2.00069 | 25.5 |
| 2 | 35.864 | 7.13 | 1.43875 | 94.9 |
| 3 | −2962.152 | 0.10 | | |
| 4 | 38.914 | 3.00 | 1.49700 | 81.5 |
| 5 | 81.708 | 0.10 | | |
| 6 | 31.764 | 3.49 | 1.49741 | 81.5 |
| 7 | 82.659 | (Variable) | | |
| 8 | 74.736 | 0.45 | 2.00100 | 29.1 |
| 9 | 6.188 | 3.00 | | |
| 10 | −26.341 | 1.52 | 1.95906 | 17.5 |
| 11 | −10.361 | 0.40 | 2.00100 | 29.1 |
| 12 | 27.305 | 0.10 | | |
| 13 | 15.129 | 2.29 | 1.95906 | 17.5 |
| 14 | −23.933 | 0.40 | 2.00100 | 29.1 |
| 15 | 99.734 | (Variable) | | |
| 16 (Stop) | ∞ | 1.50 | | |
| 17* | 28.642 | 2.05 | 1.76802 | 49.2 |
| 18* | −146.610 | 0.10 | | |
| 19 | 35.035 | 3.18 | 1.43875 | 94.9 |
| 20 | −32.705 | 0.10 | | |
| 21 | 83.358 | 0.60 | 2.00100 | 28.5 |
| 22 | 34.579 | (Variable) | | |
| 23* | 27.633 | 2.31 | 1.55332 | 71.7 |
| 24 | −35.860 | 0.10 | | |
| 25 | 19.785 | 0.50 | 1.95906 | 17.5 |
| 26 | 13.686 | 2.87 | 1.43875 | 94.9 |
| 27 | −35.518 | (Variable) | | |
| 28 | −28.785 | 0.50 | 1.97454 | 31.7 |
| 29 | 8.686 | 3.03 | | |
| 30 | 37.804 | 1.50 | 1.77271 | 25.4 |
| 31 | −12.366 | 0.50 | | |
| 32 | ∞ | 2.20 | 1.51600 | 64.2 |
| 33 | ∞ | 3.89 | | |
| Image plane | ∞ | | | |

Aspherical surface data

Seventeenth surface

K = 0.00000e+000 A4 = −3.07742e−005 A6 = 3.73797e−008
A8 = −9.05237e−010 A10 = 3.99687e−012
Eighteenth surface K = 0.00000e+000 A4 = 1.08386e−005 A6 = 2.62614e−008
Twenty-third surface K = 0.00000e+000 A4 = −4.39913e−005 A6 = −2.61254e−007
A8 = 1.43198e−008 A10 = −1.35657e−010

Various data
Zoom ratio 50.09

| | Wide angle | Intermediate | Telephoto |
|---|---|---|---|
| Focal length | 4.25 | 71.59 | 213.01 |
| F number | 1.65 | 5.95 | 6.50 |
| Half angle of field (degree) | 35.20 | 2.40 | 0.81 |
| Image height | 3.00 | 3.00 | 3.00 |
| Total lens length | 94.99 | 94.99 | 94.99 |
| BF | 5.84 | 5.84 | 5.84 |
| d7 | 0.55 | 30.02 | 34.04 |
| d15 | 35.09 | 5.62 | 1.60 |
| d22 | 7.59 | 1.81 | 11.31 |
| d27 | 4.32 | 10.10 | 0.60 |

Zoom lens unit data

| Unit | First surface | Focal length |
|---|---|---|
| 1 | 1 | 46.95 |
| 2 | 8 | −5.45 |
| 3 | 16 | 24.04 |
| 4 | 23 | 17.71 |
| 5 | 28 | −49.37 |

[Numerical Embodiment 6]

Unit: mm

Surface data

| Surface number | ri | di | ndi | vdi |
|---|---|---|---|---|
| 1 | 52.530 | 1.30 | 2.00069 | 25.5 |
| 2 | 33.828 | 5.14 | 1.43875 | 94.9 |
| 3 | 508.759 | 0.10 | | |
| 4 | 39.119 | 2.88 | 1.49700 | 81.5 |
| 5 | 115.074 | 0.10 | | |
| 6 | 29.746 | 3.15 | 1.67776 | 57.9 |
| 7 | 87.210 | (Variable) | | |
| 8 | 96.118 | 0.45 | 2.00100 | 29.1 |
| 9 | 6.362 | 2.92 | | |
| 10 | −22.400 | 1.20 | 1.95906 | 17.5 |
| 11 | −11.647 | 0.40 | 2.00100 | 29.1 |
| 12 | 29.403 | 0.10 | | |
| 13 | 15.877 | 2.30 | 1.95906 | 17.5 |
| 14 | −21.598 | 0.40 | 2.00100 | 29.1 |
| 15 | −11361.397 | (Variable) | | |
| 16 (Stop) | ∞ | 1.50 | | |

-continued

Unit: mm

| | | | | |
|---|---|---|---|---|
| 17* | 17.560 | 2.22 | 1.76802 | 49.2 |
| 18* | 324.482 | 0.10 | | |
| 19 | 27.159 | 1.92 | 1.43875 | 94.9 |
| 20 | −190.306 | 0.10 | | |
| 21 | 72.053 | 0.60 | 1.94436 | 23.6 |
| 22 | 31.893 | (Variable) | | |
| 23* | 30.396 | 1.71 | 1.55332 | 71.7 |
| 24 | −36.711 | 0.10 | | |
| 25 | 19.678 | 0.50 | 1.95906 | 17.5 |
| 26 | 13.484 | 2.92 | 1.43875 | 94.9 |
| 27 | −21.276 | (Variable) | | |
| 28 | −21.221 | 0.50 | 1.99960 | 29.3 |
| 29 | 9.841 | 1.37 | | |
| 30 | 45.847 | 1.33 | 1.80816 | 22.8 |
| 31 | −12.172 | 0.50 | | |
| 32 | ∞ | 2.20 | 1.51600 | 64.2 |
| 33 | ∞ | 3.89 | | |
| Image plane | ∞ | | | |

Aspherical surface data

Seventeenth surface

K = 0.00000e+000 A4 = −3.39995e−005 A6 = 6.36518e−008
A8 = 9.11597e−010 A10 = −6.90885e−012
Eighteenth surface K = 0.00000e+000 A4 = 8.91588e−006 A6 = 2.52342e−007
Twenty-third surface K = 0.00000e+000 A4 = −1.25889e−004 A6 = 7.07707e−007
A8 = −1.12887e−008 A10 = 1.35577e−010

Various data
Zoom ratio 34.09

| | Wide angle | Intermediate | Telephoto |
|---|---|---|---|
| Focal length | 4.29 | 59.58 | 146.39 |
| F number | 1.65 | 4.58 | 5.00 |
| Half angle of field (degree) | 34.94 | 2.88 | 1.17 |
| Image height | 3.00 | 3.00 | 3.00 |
| Total lens length | 81.53 | 81.53 | 81.53 |
| BF | 5.84 | 5.84 | 5.84 |
| d7 | 0.60 | 25.78 | 29.21 |
| d15 | 29.60 | 4.42 | 0.99 |
| d22 | 5.88 | 2.01 | 9.67 |
| d27 | 4.29 | 8.16 | 0.49 |

Zoom lens unit data

| Unit | First surface | Focal length |
|---|---|---|
| 1 | 1 | 40.26 |
| 2 | 8 | −5.78 |
| 3 | 16 | 22.11 |
| 4 | 23 | 16.24 |
| 5 | 28 | −24.22 |

TABLE 1

| Conditional Expression | Numerical Embodiment | | | | | |
|---|---|---|---|---|---|---|
| | 1 | 2 | 3 | 4 | 5 | 6 |
| (1) | 1.67 | 1.77 | 1.79 | 2.58 | 1.71 | 2.44 |
| (2) | 3.29 | 3.46 | 3.20 | 4.32 | 3.12 | 4.15 |
| (3) | 1.25 | 1.23 | 1.26 | 1.24 | 1.28 | 1.35 |
| (4) | 1.96 | 1.95 | 1.79 | 1.67 | 1.83 | 1.70 |
| (5) | 4.83 | 4.85 | 5.27 | 5.77 | 6.14 | 4.35 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent configurations and functions.

This application claims the benefit of Japanese Patent Application No. 2014-042356, filed Mar. 5, 2014, which is hereby incorporated by reference wherein in its entirety.

What is claimed is:

1. A zoom lens, comprising, in order from an object side to an image side:
   a first lens unit having a positive refractive power;
   a second lens unit having a negative refractive power;
   a third lens unit having a positive refractive power;
   a fourth lens unit having a positive refractive power; and
   a fifth lens unit having a positive refractive power or a negative refractive power,
   wherein the first lens unit and the fifth lens unit do not move for zooming, and the second lens unit and the fourth lens unit move during zooming,
   wherein the second lens unit includes at least three negative lenses and at least two positive lenses, including:
   a first negative lens disposed on a most object side;
   a first positive meniscus lens having a concave surface on an object side disposed adjacent to, and on an image side of, the first negative lens; and
   a second negative lens disposed adjacent to, and on an image side of, the first positive meniscus lens,
   wherein the following conditional expressions are satisfied:

$1.2 < fp1/fp2 < 3.0;$ $2.5 < |fp1/f2| < 5.0;$ and $0.9 |f2/fw| < 2.0,$ where fw represents a focal length of the zoom lens at a wide angle end, f2 represents a focal length of the second lens unit, fp1 represents a focal length of the first positive meniscus lens, and fp2 represents a focal length of a second positive lens,
   wherein the second positive lens is a positive lens arranged on a second most object side among the at least two positive lenses in the second lens unit, and
   wherein the fourth lens unit moves during focusing.

2. A zoom lens according to claim 1, wherein the following conditional expression is satisfied:

$1.3 < |fp2/f2| < 2.3.$

3. A zoom lens according to claim 1, wherein the following conditional expression is satisfied:

$4.0 < BL2str/|f2| < 10.0$ where BL2 str represents a movement amount of the second lens unit during zooming from the wide angle end to a telephoto end.

4. A zoom lens according to claim 1, wherein the second lens unit consists of, in order from the object side to the image side, the first negative lens having a concave surface on the image side, the first meniscus lens having a concave surface facing the object side, the second negative lens having a biconcave shape, a positive lens having a convex surface on the object side, and a third negative lens.

5. A zoom lens according to claim 1, wherein during zooming from the wide angle end to a telephoto end, the second lens unit moves to the image side, and the fourth lens unit moves along a locus convex to the object side.

6. A zoom lens according to claim 1, wherein the fifth lens unit has the negative refractive power.

7. An image pickup apparatus comprising:
a zoom lens; and
an image sensor configured to receive an image formed by the zoom lens,
wherein the zoom lens comprises, in order from an object side to an image side:
- a first lens unit having a positive refractive power;
- a second lens unit having a negative refractive power;
- a third lens unit having a positive refractive power;
- a fourth lens unit having a positive refractive power; and
- a fifth lens unit having a positive refractive power or a negative refractive power, wherein the first lens unit and the fifth lens unit do not move for zooming, and the second lens unit and the fourth lens unit move during zooming,
wherein the second lens unit includes at least three negative lenses and at least two positive lenses, including:
- a first negative lens disposed on a most object side;
- a first positive meniscus lens having a concave surface on an object side disposed adjacent to, and on an image side of, the first negative lens; and
- a second negative lens disposed adjacent to, and on an image side of, the first positive meniscus lens, wherein the following conditional expressions are satisfied:

$1.2 < fp1/fp2 < 3.0;$ $2.5 < |fp1/f2| < 5.0;$ and $0.9 < |f2/fw| < 2.0,$ where fw represents a focal length of the zoom lens at a wide angle end, f2 represents a focal length of the second lens unit, fp1 represents a focal length of the first positive meniscus lens, and fp2 represents a focal length of a second positive lens,
wherein the second positive lens is a positive lens arranged on a second most object side among the at least two positive lenses in the second lens unit, and
wherein the fourth lens unit moves during focusing.

* * * * *